(12) United States Patent
Kitaura et al.

(10) Patent No.: US 11,814,703 B2
(45) Date of Patent: Nov. 14, 2023

(54) TITANIUM MATERIAL FOR HOT WORKING

(71) Applicant: NIPPON STEEL CORPORATION, Tokyo (JP)

(72) Inventors: Tomoyuki Kitaura, Tokyo (JP); Yoshihisa Shirai, Tokyo (JP); Hideki Fujii, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 132 days.

(21) Appl. No.: 17/338,775

(22) Filed: Jun. 4, 2021

(65) Prior Publication Data

US 2021/0292871 A1 Sep. 23, 2021

Related U.S. Application Data

(62) Division of application No. 15/747,209, filed as application No. PCT/JP2016/072344 on Jul. 29, 2016, now Pat. No. 11,066,727.

(30) Foreign Application Priority Data

Jul. 29, 2015 (JP) .................................. 2015-149388

(51) Int. Cl.
  *C22C 14/00* (2006.01)
  *B21B 3/00* (2006.01)
  (Continued)

(52) U.S. Cl.
  CPC ............... *C22C 14/00* (2013.01); *B21B 1/22* (2013.01); *B21B 3/00* (2013.01); *B23K 20/00* (2013.01);
  (Continued)

(58) Field of Classification Search
  None
  See application file for complete search history.

(56) References Cited

U.S. PATENT DOCUMENTS 2,867,895 A * 1/1959 Howell ..................... C22B 9/20
  428/605
3,626,578 A * 12/1971 Price ....................... B21C 23/01
  419/48

(Continued)

FOREIGN PATENT DOCUMENTS

CN        1667141       9/2005
CN      104520456       4/2015
(Continued)

OTHER PUBLICATIONS

Geisendorfer et al., "Hot Isostatic Pressing of Titanium 6Al-4V", 1973, Titanium Science and Technology, vol. 1, pp. 399-418 (Year: 1973).*

(Continued)

*Primary Examiner* — Seth Dumbris
(74) *Attorney, Agent, or Firm* — Clark & Brody LP

(57) ABSTRACT

Provided is a titanium composite material 1 including: a first surface layer portion 2; an inner layer portion 4; and a second surface layer portion 3; wherein: the first surface layer portion 2 and the second surface layer portion 3 are composed of a titanium alloy; the inner layer portion 4 is composed of a commercially pure titanium including pores; a thickness of at least one of the first surface layer portion 2 and the second surface layer portion 3 is 2 μm or more, and a proportion of the thickness with respect to an overall thickness of the titanium composite material 1 is 40% or less; and a porosity in a cross section perpendicular to a sheet thickness direction is more than 0% and 30% or less.

2 Claims, 3 Drawing Sheets

(51) Int. Cl.
    *B32B 15/01*      (2006.01)
    *B32B 3/26*      (2006.01)
    *B23K 20/00*      (2006.01)
    *B21B 1/22*      (2006.01)
    *B21B 1/02*      (2006.01)

(52) U.S. Cl.
    CPC ............... *B32B 3/26* (2013.01); *B32B 15/01* (2013.01); *B21B 1/02* (2013.01); *B21B 2001/225* (2013.01); *Y10T 428/12479* (2015.01); *Y10T 428/12806* (2015.01)

(56) References Cited

U.S. PATENT DOCUMENTS

| | | | |
|---|---|---|---|
| 4,681,627 A * | 7/1987 | Mae | C22B 9/04 |
| | | | 75/10.19 |
| 4,966,816 A | 10/1990 | Wardlaw et al. | |
| 5,074,907 A * | 12/1991 | Amato | C22F 1/183 |
| | | | 75/235 |
| 5,301,403 A | 4/1994 | Blank-Bewersdorff et al. | |
| 5,564,064 A | 10/1996 | Martin | |
| 5,579,988 A | 12/1996 | Schutz et al. | |
| 5,972,521 A | 10/1999 | Huskamp et al. | |
| 6,085,965 A | 7/2000 | Schwartz | |
| 2004/0134574 A1* | 7/2004 | Kaibyshev | B21J 1/025 |
| | | | 148/670 |
| 2005/0112397 A1 | 5/2005 | Rolfe | |
| 2010/0061925 A1* | 3/2010 | Lee | C01B 6/02 |
| | | | 423/645 |
| 2011/0146853 A1* | 6/2011 | Miracle | C22C 14/00 |
| | | | 148/564 |
| 2014/0161660 A1 | 6/2014 | Kaminaka | |
| 2015/0167121 A1 | 6/2015 | Kaminaka et al. | |

FOREIGN PATENT DOCUMENTS

| | | |
|---|---|---|
| JP | 50-146557 | 11/1975 |
| JP | 52-029407 | 3/1977 |
| JP | 58-006704 | 1/1983 |
| JP | 63-080904 | 4/1988 |
| JP | 63-207401 | 8/1988 |
| JP | 01-168833 | 7/1989 |
| JP | 02-187282 | 7/1990 |
| JP | 05-125508 | 5/1993 |
| JP | 05-142392 | 6/1993 |
| JP | 08-141754 | 6/1996 |
| JP | 09-136102 | 5/1997 |
| JP | 11-057810 | 3/1999 |
| JP | 11-170076 | 6/1999 |
| JP | 2001-089821 | 4/2001 |
| JP | 2001-131609 | 5/2001 |
| JP | 2001-234266 | 8/2001 |
| JP | 2005-290548 | 10/2005 |
| JP | 2007-332420 | 12/2007 |
| JP | 2008-115419 | 5/2008 |
| JP | 2008-195994 | 8/2008 |
| JP | 2009-068026 | 4/2009 |
| JP | 2011-042828 | 3/2011 |
| JP | 2012-077346 | 4/2012 |
| JP | 2013-076110 | 4/2013 |
| JP | 2013-142183 | 7/2013 |
| JP | 2013-163840 | 8/2013 |
| JP | 2014-019945 | 2/2014 |
| JP | 2014-233753 | 12/2014 |
| JP | 2015-045040 | 3/2015 |
| RU | 2478448 | 4/2013 |
| WO | 2013/014894 | 1/2013 |
| WO | 2014/163086 | 10/2014 |
| WO | 2014/163087 | 10/2014 |

OTHER PUBLICATIONS

"Chitan No Kakou Gijyutsu" ("Fabrication Technique of Titanium"), (SHA) Nihon Chitan Kyoukai Hen (Japan Titanium Society), Nikkan Kougyou Shinbunsra, p. 214-230, November 1992.
Titanium Producs, NSSMC. Sept. 2014, p. 16-17.
"Commercially Pure (GP) Titanium and Alpha Aiioys", 2007, Engineering Matierais, Processes. Springer, pp. 175-201 (2007).
SupraAlloys.com,"Titanium Grade Overview", Apr. 2014, https://web.archive.org/web/20140420135654/ http://www.supraalloys.com/titanium-grades.php, accessed Oct. 7, 2020 (Year: 2014).
Machine translation of JP02-187282A.

* cited by examiner

Plane bending fatigue test specimen

TITANIUM MATERIAL FOR HOT WORKING

This application is a Divisional of U.S. Ser. No. 15/747,209 filed on Jan. 24, 2018, which is a national phase of PCT/JP2016/072344 filed on Jul. 29, 2016.

TECHNICAL FIELD

The present invention relates to a titanium composite material and a titanium material for hot working.

BACKGROUND ART

A titanium material is excellent in properties such as corrosion resistance, oxidation resistance, fatigue resistance, hydrogen embrittlement resistance, and neutron blocking properties. These properties can be attained by adding various alloying elements to titanium.

Because a titanium material is light weight and excellent in corrosion resistance, for example, a titanium material is utilized for seawater-cooled condensers at power generating plants, heat exchangers for ocean water desalinization plants, reaction vessels of chemical plants and also for coolers and the like.

Commercially pure titanium exhibits excellent corrosion resistance particularly in environments including nitrate or chromate or the like, and environments including seawater or chloride ions and the like. However, in environments including hydrochloric acid, sulfuric acid or the like, a high corrosion resistance cannot be expected, and in environments including chlorine ions or the like, crevice corrosion sometimes occurs.

Therefore, various kinds of alloys, such as Ti-0.2Pd (ASTM Gr. 7, 11), are being developed in which trace amounts of platinum group elements (Ru, Rh, Pd, Os, Ir, Pt and the like) are added to titanium. Further, corrosion resistant titanium alloys that are inexpensive and excellent in corrosion resistance, such as Ti-0.5Ni-0.05Ru in which Ni and Ru are substituted for Pd, are also being developed.

A titanium material is excellent in specific strength and corrosion resistance, and hence utilization of titanium material in the field of aircraft construction is progressing, and titanium material is also being widely used for exhaust systems of automobiles and two-wheeled vehicles. In particular, from the viewpoint of reducing the weight of vehicles, a commercially pure titanium material of JIS Class 2 is being used instead of the conventional stainless steel material for vehicle production centering on two-wheeled vehicles. In addition, in recent years, a heat-resistant titanium alloy having a higher heat resistance is being used in place of commercially pure titanium material of JIS Class 2. Furthermore, titanium material is also being used for mufflers in which a catalyst that is used at a high temperature is mounted for the purpose of removing harmful components in exhaust gas.

The temperature of exhaust gas exceeds 700° C., and in some cases the temperature temporarily reaches 800° C. Consequently, material to be used for an exhaust system is required to have strength, oxidation resistance and the like at a temperature of around 800° C., and furthermore, importance is placed on the index of high-temperature heat resistance with respect to the creep rate at 600 to 700° C.

On the other hand, to improve the high temperature strength of such heat-resistant titanium alloys, it is necessary to add elements that improve high temperature strength and oxidation resistance such as Al, Cu and Nb, and the cost of the heat-resistant titanium alloys is high in comparison to commercially pure titanium.

JP2001-234266A (Patent Document 1) discloses a titanium alloy that is excellent in cold workability and high temperature strength, and that contains Al: 0.5 to 2.3% (in the present description, unless otherwise specified, "%" with respect to chemical composition means "mass percent").

JP2001-89821A (Patent Document 2) discloses a titanium alloy that is excellent in oxidation resistance and corrosion resistance, and that contains Fe: more than 1% to 5% and O (oxygen): 0.05 to 0.75%, and also contains Si: $0.01 \cdot e^{0.5[Fe]}$ to $5 \cdot e^{-0.5[Fe]}$ ([Fe] represents content (mass %) in the alloy, and "e" represents base of natural logarithm).

JP2005-290548A (Patent Document 3) discloses a heat-resistant titanium alloy plate that is excellent in cold workability and that contains Al: 0.30 to 1.50% and Si: 0.10 to 1.0%, and a method for producing the heat-resistant titanium alloy plate.

JP2009-68026A (Patent Document 4) discloses a titanium alloy that contains Cu: 0.5 to 1.8%, Si: 0.1 to 0.6%, and O: 0.1% or less, and as necessary contains Nb: 0.1 to 1.0%, with the balance being Ti and unavoidable impurities, and having a protective film coated on the surface thereof.

In addition, JP2013-142183A (Patent Document 5) discloses a titanium alloy that is excellent in high temperature strength at 700° C. and in oxidation resistance at 800° C. that contains Si: 0.1 to 0.6%, Fe: 0.04 to 0.2% and O: 0.02 to 0.15% and in which the total content of Fe and O is 0.1 to 0.3%, with the balance being Ti and unavoidable impurity elements.

A titanium cold-rolled sheet or plate (hereinafter referred to as "sheet") product for industrial use (for example, a commercially pure titanium cold-rolled sheet product) is used, for example, by forming a sheet product into a predetermined shape such as in the case of a sheet-type heat exchanger or an FC separator, and the uses thereof are expanding. Consequently, in addition to formability, thinning that is achieved by an improvement in fatigue strength, as well as a high additional environment (under a high load) are also required for titanium cold-rolled sheet products for industrial use.

On the other hand, similarly to other metallic materials, in the case of pure titanium, there is a contrary relation between ductility, which governs formability, and strength (fatigue strength).

JP2008-195994A (Patent Document 6) discloses a method that performs surface modification of a product made of titanium to improve fatigue strength by performing a plasma nitriding process that performs plasma nitriding which takes a product made of any of pure titanium, an α-type titanium alloy, a β-type titanium alloy and an α+β-type titanium alloy as a treatment object to form a hardened layer on the surface of the treatment object, and then removes a compound layer that is present on the surface of the hardened layer by performing a fine particle bombardment treatment in which the treatment object is subjected to bombardment with one or more kinds of fine particles after the plasma nitriding process.

JP2013-76110A (Patent Document 7) discloses a surface treatment method for treating a surface of a substrate consisting of a titanium alloy and titanium, the method including a step A of subjecting the surface of a substrate made of titanium alloy and titanium to a fine particle peening process, a step B of performing a first heat treatment in a temperature range T1, a step C of performing a second heat treatment in a temperature range T2, and a step D of performing a third heat treatment in a temperature range T3 which are performed in the order mentioned, which satisfies the relation T1>T2>T3, and in which T1 is made a temperature from 900 to 1000° C. That is, this surface treatment method improves fatigue strength by forming, in a region in the vicinity of the surface of a titanium material, an amorphous layer, a fine grain layer (a phase; grain diameter: approximately 300 nm), a sub-micron grain layer (α phase; grain diameter: approximately 500 nm), and a micron grain layer (β phase; grain diameter: approximately 3000 nm) in the order from the surface side.

A commercially pure titanium contains the α phase of an hcp (hexagonal close-packed) structure as a main constituent, and it is known that if a large amount of hydrogen is absorbed in the α phase, hydrides will be formed and the commercially pure titanium will become brittle. Therefore, depending on the usage environment, in some cases accidents occur in which commercially pure titanium absorbs hydrogen and becomes brittle and ruptures. In "CHITAN NO KAKOU GIJYUTSU" (Non-Patent Document 1), for example, accidents caused by absorption of hydrogen at a plant handling a nonoxidizing acid or in a urea-ammonia environment and a hydrogen gas environment are reported. Therefore, a titanium alloy product that is excellent in hydrogen embrittlement resistance is proposed.

JP2013-163840A (Patent Document 8) discloses a titanium alloy that exhibits large breaking elongation and that contains 50% or more by volume of β phase and contains 500 to 6000 ppm of hydrogen, and an example is described in which embrittlement does not occur even when a large amount of hydrogen is contained.

A neutron shielding sheet that is capable of shielding from thermal neutrons is used at facilities that handle radioactive waste such as facilities related to nuclear power generation. A neutron shielding effect is highest in boron 10 ($^{10}$B) whose abundance is 19.9% in natural B. Stainless steel or the like containing B is generally used as material for a neutron shielding sheet.

JP58-6704B (Patent Document 9) discloses a neutron blocking material that contains 5% by mass or more of B, which is a cured compact formed by kneading and molding a borate aggregate containing crystal water such as kurnakovite ($2MgO \cdot 3B_2O_2 \cdot 13H_2O$), Meyerhof-ferrite ($3CaO \cdot 3B_2O_2 \cdot 7H_2O$), or colemanite ($2CaO \cdot 3B_2O_2 \cdot 5H_2O$), hemihydrate gypsum, and an inorganic adhesive agent such as a calcium aluminate-based cement with water. Patent Document 9 discloses, however, the neutron shielding material including cement, there are problems in terms of corrosion resistance, producibility and also workability.

The use of a boron-containing titanium alloy that is superior in corrosion resistance to stainless steel as a neutron blocking material is also being studied. For example, JP1-168833B (Patent Document 10) discloses the use of a heat-rolled plate made of a boron-containing titanium alloy which contains 0.1 to 10% by mass of B with the balance being titanium and unavoidable impurities.

In addition, JP5-142392A (Patent Document 11) discloses a radiation shielding material in which a fluid of a boron-containing substance ($NaB_4O_7$, $B_2O_3$ or PbO, $Fe_2O_3$ or the like) and metallic oxides that are mixed therein are filled within a hollow metal casing and made into a solidified state. According to Patent Document 11, neutrons are blocked by mainly boron and hydrogen, and gamma rays are blocked by the casing, the metal and the like therein.

A titanium material is normally produced by the following method. First, using the Kroll process, titanium oxide as the raw material is chlorinated to form titanium tetrachloride, and thereafter is reduced using magnesium or sodium to produce massive and sponge-like titanium metal (titanium sponge. The titanium sponge is subjected to press-forming to form a consumable titanium electrode, and a titanium ingot is produced by vacuum arc melting that adopts the consumable titanium electrode as an electrode. At such time, alloying elements are added as required to produce a titanium alloy ingot. Thereafter, the titanium alloy ingot is bloomed, forged and rolled to form a titanium slab, and the titanium slab is further subjected to hot rolling, annealing, pickling, cold rolling, and a vacuum heat treatment to produce a titanium sheet.

Further, as a method for producing a titanium sheet, a method is also known in which a titanium ingot is subjected to blooming, hydrogenation-crushing, dehydrogenation, pulverization and classifying to produce a titanium powder, and thereafter the titanium powder is subjected to powder rolling, sintering and cold rolling to produce a titanium sheet.

JP2011-42828A (Patent Document 12) discloses a method for producing a titanium sheet, in which a titanium powder is produced directly from titanium sponge and not a titanium ingot, and in order to produce a titanium sheet from the obtained titanium powder, a pre-sintering compact in which a viscous composition containing a titanium metal powder, a binding agent, a plasticizer and a solvent is formed in a sheet shape is sintered to produce a sintered sheet, the sintered sheet is consolidated to produce a sintered and consolidated sheet, and the sintered and consolidated sheet is then re-sintered, in which the breaking elongation of the sintered sheet is 0.4% or more, the density ratio of the sintered sheet is 80% or more, and the density ratio of the sintered and consolidated sheet is 90% or more.

JP2014-19945A (Patent Document 13) discloses a method for producing a titanium alloy that is excellent in quality by a powder method, in which a suitable amount of iron powder, chromium powder or copper powder is added to a titanium alloy powder for which titanium alloy scrap or a titanium alloy ingot is adopted as a raw material to thereby form a composite powder, the composite powder is extruded from a carbon steel capsule, and the capsule is melted and removed from the surface of an obtained round bar, and thereafter a solution treatment or a solution treatment and aging treatment are performed.

JP2001-131609A (Patent Document 14) discloses a method for producing a titanium compact, in which a copper capsule is packed with a titanium sponge powder and thereafter subjected to a hot extrusion process at an extrusion ratio of 1.5 or more and an extrusion temperature of 700° C. or less and formed, an outer circumference process is performed to remove copper from the outside, and thereby obtain a titanium compact in which 20% or more of the total length of the grain boundary of the compact is in contact with a metal.

When subjecting hot rolling material to hot rolling, in a case where the hot rolling material is a so-called "difficult-to-process material" which lacks ductility and has a high hot deformation resistance value during hot processing, such as pure titanium or a titanium alloy, a pack-rolling method is known as a technique for rolling such materials into a sheet. The pack-rolling method is a method in which a core material such as a titanium alloy that has poor workability is covered with a cover material such as carbon steel that has good workability and is inexpensive, and hot rolling is then performed.

Specifically, for example, a release agent is coated on the surface of the core material, and at least the upper and lower two faces thereof are covered with a cover material, or in addition to the upper and lower faces, the four peripheral faces are covered by a spacer material, and the circumference is welded and assembled and hot rolling is performed. In pack rolling, the core material that is the material to be rolled is covered with a cover material and subjected to hot rolling. Therefore, because the core material surface is not directly touched by a cold medium (atmospheric air or a roll) and therefore a decrease in the temperature of the core material can be suppressed, production of a sheet is possible even from a core material that has poor workability.

JP63-207401A (Patent Document 15) discloses a method for assembling a sealed covered pack, JP09-136102A (Patent Document 16) discloses a method for producing a sealed covered pack which is sealed with a cover material at a degree of vacuum of the order of 103 torr or more, and JP11-057810A (Patent Document 17) discloses a method for producing a sealed covered pack which is covered with a carbon steel (cover material) and sealed by high-energy density welding under a vacuum of the order of $10^{-2}$ torr or less.

On the other hand, as a method for inexpensively producing material having high corrosion resistance, a method is known for joining a titanium material to the surface of material that serves as a base metal.

JP08-141754A (Patent Document 18) discloses a method for producing a titanium clad steel plate, in which a steel material is used as a base metal and titanium or a titanium alloy is used as a cladding material, and in which assembled slabs for rolling that were assembled by welding the joining surfaces of the base metal and cladding material after being evacuated of air, are joined by hot rolling.

JP11-170076A (Patent Document 19) discloses a method for producing a titanium covered steel material by laminating and disposing a titanium foil material on the surface of a steel material as a base metal that contains 0.03% by mass or more of carbon with, interposed therebetween, an insert material having a thickness of 20 μm or more that consists of any one of low-carbon steels in which the content of pure nickel, pure iron and carbon is 0.01% by mass or less, and thereafter irradiating a laser beam from any one side in the lamination direction to melt and join at least the vicinity of the edges of the titanium foil material and the steel material as the base metal over the entire circumference.

In addition, JP2015-045040A (Patent Document 20) exemplifies a method for producing, using very little energy, dense titanium material (a titanium ingot) including a porous portion formed by forming a porous titanium raw material (titanium sponge) into an ingot shape, and a dense coating portion that is constituted by dense titanium and that covers the entire surface of the porous portion, by producing a titanium ingot by melting the surface of the porous titanium raw material formed in an ingot shape using an electron beam under vacuum to turn a surface layer portion into dense titanium, and subjecting the titanium ingot to hot rolling and cold rolling.

LIST OF PRIOR ART DOCUMENTS

Patent Documents

Patent Document 1: JP2001-234266A
Patent Document 2: JP2001-89821A
Patent Document 3: JP2005-290548A
Patent Document 4: JP2009-68026A
Patent Document 5: JP2013-142183A
Patent Document 6: JP2008-195994A
Patent Document 7: JP2013-76110A
Patent Document 8: JP2013-163840A
Patent Document 9: JP58-6704B
Patent Document 10: JP1-168833B
Patent Document 11: JP5-142392A
Patent Document 12: JP2011-42828A
Patent Document 13: JP2014-19945A
Patent Document 14: JP2001-131609A
Patent Document 15: JP63-207401A
Patent Document 16: JP09-136102A
Patent Document 17: JP11-057810A
Patent Document 18: JP08-141754A
Patent Document 19: JP11-170076A
Patent Document 20: JP2015-045040A Non Patent Document Non-Patent Document 1: CHITAN NO KAKOU GIJYUTSU, (SHA) NIHON CHITAN KYOUKAI HEN, NIKKAN KOUGYOU SHINBUNSHA, p. 214-230, published November 1992

SUMMARY OF INVENTION

Technical Problem

As described in the foregoing, because titanium alloys in which corrosion resistance is improved contain platinum group elements which are scarce and expensive, the production cost of the titanium alloys increases significantly.

Patent Document 1 discloses the titanium alloy to which Al is added, there is an adverse effect on forming workability, particularly on bulging formability when the working occurs in a direction in which the wall thickness decreases.

Patent Document 2 discloses the titanium alloy the total content of Fe and O of which is large, the strength at room temperature is more than 800 N/mm$^2$ which is a value that is too strong, and consequently the formability is poor, with elongation being not more than 20%.

Patent Document 3 discloses the titanium alloy to which Al is added, similarly to the titanium alloy described above, there is a risk of adversely affecting cold workability, particularly on bulging formability when the working occurs in a direction in which the wall thickness decreases.

Patent Document 4 discloses the titanium alloy having sufficient workability and oxidation resistance properties, because the titanium alloy contains a large amount of Nb which is expensive, the alloy cost increases.

In addition, Patent Document 5 discloses the titanium alloy having sufficient high-temperature oxidation properties, the alloy cost increases because the entire plate surface is alloyed.

Patent Document 6 discloses the method, in which although C and N which have a high solid-solution strengthening ability are used for formation of a hardened layer and consequently the titanium hardens and the fatigue strength can be improved when the C and N are dissolved, this results in a rapid decrease in ductility, and hence the formability is poor.

Further, according to the results of studies conducted by the present inventors, Patent Document 7 discloses the surface treatment method, by means of which is not easy to improve formability.

In addition, Patent Documents 6 and 7 disclose the inventions, in which it is necessary to perform a special surface treatment on a titanium material, and an increase in the production cost is unavoidable.

As a measure to counter embrittlement caused by hydrogen, generally a surface treatment that provides hydrogen absorption resistance is performed after working into a finished product, or electrolytic protection is carried out with respect to the finished product. However, both of these cases involve an increase in product working or in the man-hours for working and the like, and consequently an increase in cost is unavoidable, and a titanium material that is excellent in hydrogen embrittlement resistance cannot be provided at a low cost.

Further, Patent Document 8 discloses the method in which, in order to make 50% or more by volume of the entire material β phase, it is necessary for a large amount of expensive additional elements to be contained, and hence the cost increases.

Patent Document 10 discloses the heat-rolled plate the B content in which is high, it cannot be denied that the cost increases, and the workability is also not favorable, and the use thereof as a neutron shielding plate is difficult in practice.

In addition, Patent Document 12 discloses the radiation shielding material in which a casing material made of metal is packed with a boron-containing substance, and working thereof is difficult after the boron-containing substance has been supplied.

Conventionally, when producing a titanium material by way of hot working, titanium sponge is press-formed to form a consumable titanium electrode, a titanium ingot is produced by performing vacuum arc melting that adopts the consumable titanium electrode as an electrode, the titanium ingot is then subjected to blooming, forging and rolling to form a titanium slab, and the titanium slab is subjected to hot rolling, annealing, pickling and cold rolling to produce the titanium material.

In this case, a process of melting titanium to produce a titanium ingot has been invariably added. Although a method for producing a titanium material by subjecting titanium powder to powder rolling, sintering, and cold rolling is also known, a method for producing titanium powder from a titanium ingot has also included a process of melting titanium.

In a method for producing a titanium material from titanium powder, even if a melting process is not undergone, the obtained titanium material is extremely expensive because expensive titanium powder is used as raw material. Patent Documents 15 and 16 disclose the methods with respect to which the situation similarly applies.

In pack rolling, a core material to be covered by a cover material is merely a slab or an ingot, and undergoes a melting process or adopts expensive titanium powder as a raw material, and hence the production cost cannot be reduced.

According to Patent Document 20, although a dense titanium material can be produced using an extremely small amount of energy, according to this method the surface of titanium sponge formed in an ingot shape is melted and the surface layer portion and internal components of the dense titanium are specified as pure titanium or a titanium alloy of the same grade, and for example it is not possible to reduce the production cost by forming a titanium alloy layer uniformly over a wide range on only the surface layer portion.

On the other hand, with respect to a material obtained by joining titanium or a titanium alloy to the surface of a base metal as a method that can produce an inexpensive corrosion-resistant material, in many cases steel is selected as the base metal. Therefore, if the titanium layer on the surface is lost, the corrosion resistance will also be lost. Even if a titanium material is adopted as the base metal, as long as a titanium material is used that is produced by undergoing a normal production process, a dramatic improvement in cost cannot be expected.

An objective of the present invention is to inexpensively obtain a titanium material having desired characteristics, by reducing the content of alloying elements (usage amount of specific alloying elements that exhibit target characteristics) added to improve various characteristics required of a titanium material such as corrosion resistance, oxidation resistance, fatigue resistance, hydrogen embrittlement resistance, and neutron blocking properties, and to reduce the production cost of the titanium material.

Solution to Problem

The present invention was made to solve the problems described above, and the gist of the present invention is a titanium composite material and a titanium material for hot working which are described hereunder, (1) A titanium composite material comprising:
a first surface layer portion;
an inner layer portion; and
a second surface layer portion;
wherein:
the first surface layer portion and the second surface layer portion consist of a titanium alloy;
the inner layer portion consists of a commercially pure titanium including pores;
a thickness of at least one of the first surface layer portion and the second surface layer portion is 2 µm or more, and a proportion of the thickness with respect to an overall thickness of the titanium composite material is 40% or less; and
a porosity in a cross section perpendicular to a sheet thickness direction is more than 0% and 30% or less.

(2) The titanium composite material according to (1) above, wherein
at least one of the first surface layer portion and the second surface layer portion has a chemical composition comprising, by mass %:
platinum group elements: 0.01 to 0.25%,
rare earth elements: 0 to 0.2%,
Co: 0 to 0.8%,
Ni: 0 to 0.6%, and
a balance: Ti and impurities.

(3) The titanium composite material according to (2) above, wherein:
the platinum group elements are Pd and/or Ru.

(4) The titanium composite material according to (2) or (3) above, wherein
the chemical composition contains, by mass %:
rare earth elements: 0.001 to 0.2%.

(5) The titanium composite material according to any one of (2) to (4) above, wherein
the chemical composition contains, by mass % one or more elements selected from:
Co: 0.05 to 0.8%, and
Ni: 0.05 to 0.6%.

(6) The titanium composite material according to any one of (1) to (5) above, wherein
the commercially pure titanium has a chemical composition comprising, by mass %,
C: 0.1% or less,
H: 0.015% or less, O: 0.4% or less,
N: 0.07% or less,
Fe: 0.5% or less, and
a balance: Ti and impurities.
(7) A titanium material for hot working, comprising:
a package; and
one or more types selected from a titanium sponge, a briquette obtained by compressing a titanium sponge, and a commercially pure titanium scrap, with which the package is packed,
wherein
a portion of the package consists of a titanium alloy, the portion constituting an outer layer after hot working.
(8) The titanium material for hot working according to (7) above, wherein
the titanium alloy has a chemical composition comprising, by mass %,
platinum group elements: 0.01 to 0.25%,
rare earth elements: 0 to 0.2%,
Co: 0 to 0.8%,
Ni: 0 to 0.6%, and
a balance: Ti and impurities.

Advantageous Effects of Invention

A titanium composite material according to the present invention includes a surface layer portion consisting of a titanium alloy, and an inner layer portion consisting of a commercially pure titanium, and therefore, although having equivalent characteristics to a titanium material that consists entirely of the same titanium alloy, the titanium composite material according to the present invention can be inexpensively produced in comparison to the titanium material that consists entirely of the same titanium alloy.

DESCRIPTION OF EMBODIMENTS

To solve the problems described above, the present inventor conducted intensive studies with respect to decreasing the usage amount of specific alloying elements that exhibit target characteristics by alloying only a surface layer portion of a titanium sheet of an end product and reducing the cost of producing the titanium material. As a result, the present inventors discovered a method for producing a titanium composite material by packing and enclosing a relatively inexpensive material such as titanium sponge in a package made of titanium alloy products under a reduced pressure, and subjecting the titanium materials to hot working.

The present invention was made based on the above findings. Hereunder, the titanium composite material and a titanium material for hot rolling thereof according to the present invention are described while referring to the accompanying drawings. Note that, in the following description, unless otherwise specified, "%" relating to the content of each element means "mass percent".

1. Titanium Composite Material 1-1. Overall Structure

Figure 1:
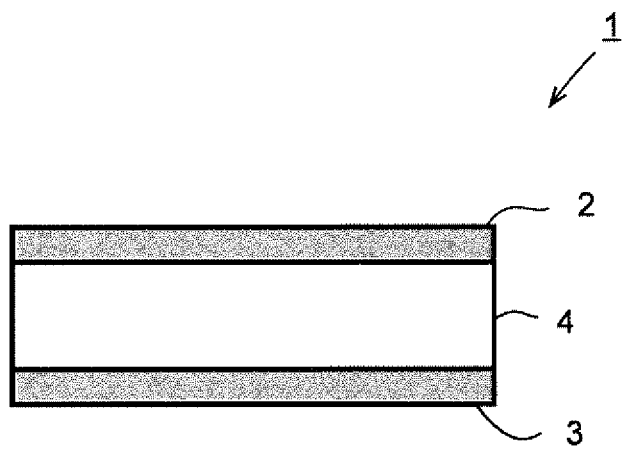
FIG. 1 is an explanatory drawing illustrating one example of the structure of a titanium composite material according to the present invention.

As illustrated in FIG. 1, a titanium composite material 1 according to the present invention includes a first surface layer portion 2, an inner layer portion 4, and a second surface layer portion 3, the first surface layer portion 2 and the second surface layer portion 3 consist of a titanium alloy, and the inner layer portion 4 consists of a commercially pure titanium in which pores are present. Corrosion resistance and other characteristics of the titanium composite material are ensured in this way by surface layer portions (the first surface layer portion 2 and the second surface layer portion 3) that contact the external environment. Further, the first surface layer portion 2 and the second surface layer portion 3 are constituted by the titanium alloy of which various performances are superior to those of a commercially pure titanium.

Although having equivalent characteristics to a titanium material that consists entirely of the same titanium alloy, the titanium composite material 1 can be inexpensively produced in comparison to the titanium material that consists entirely of the same titanium alloy.

1-2. First Surface Layer Portion and Second Surface Layer Portion

As described above, the first surface layer portion 2 and the second surface layer portion 3 consist of a titanium alloy. A particular limit is not set with respect to the chemical composition of the titanium alloy. It is known that titanium alloys are generally classified into α type, α+β type and β type. Further, it is known that Al, O, N and the like are available as a stabilizing elements, V, Mo, Cr, Fe, Nb, Ta and the like are available as β stabilizing elements, and Zr, Sn, Hf and the like are available as neutral elements that do not belong to either the α stabilizing elements or β stabilizing elements.

Table 1 shows elements which, when contained in a titanium alloy, are known to contribute to improving the characteristics of the titanium alloy. A titanium alloy according to the present invention can impart a target function to the surface of a titanium material by containing, for example, by mass %, more than 0% of one or more types of element selected from: O: 0 to 0.5%, N: 0 to 0.2%, C: 0 to 2.0%, Al: 0 to 8.0%, Sn: 0 to 10.0%, Zr: 0 to 20.0%, Mo: 0 to 25.0%, Ta: 0 to 5.0%, V: 0 to 30.0%, Nb: 0 to 40.0%, Si: 0 to 2.0%, Fe: 0 to 5.0%, Cr: 0 to 10.0%, Cu: 0 to 3.0%, Co: 0 to 3.0%, Ni: 0 to 2.0%, platinum group elements: 0 to 0.5%, rare earth elements: 0 to 0.5%, B: 0 to 5.0%, and Mn: 0 to 10.0%.

Elements which can be contained in titanium which are other than the above elements are elements that can improve strength by solid-solution strengthening or precipitation strengthening (there are cases where elements do not dissolve and cases where elements cause a precipitate to form), or depending on the element that is contained, can improve creep characteristics, which are known as common knowledge pertaining to metal materials. Elements from, in terms of atomic number, hydrogen (1) to astatine (85) (however, excluding the noble gas elements that are Group 18 elements) are exemplified as these elements, and up to approximately 5% in total of these elements is allowed.

The balance other than the above elements is Ti and impurities. The impurities can be contained in a range that does not inhibit the target characteristics, and other impurities are impurity elements that mainly get mixed in from the raw material or scrap and elements that get mixed in during production, with C, N, O, Fe, H, and the like being elements that are representative examples thereof, and in addition there are elements such as Mg and Cl that get mixed in from raw material, and elements such as Si, Al and S that get mixed in during production. It is considered that a range in which these elements do not inhibit the target characteristics of the present application is not more than approximately 2%.

Further, as shown in Table 1, the titanium alloy according to the present invention preferably contains, by mass %, one or more types of element selected from: O: 0.01 to 0.5%, N: 0.01 to 0.2%, C: 0.01 to 2.0%, Al: 0.1 to 8.0%, Sn: 0.1 to 10.0%, Zr: 0.5 to 20.0%, Mo: 0.1 to 25.0%, Ta: 0.1 to 5.0%, V: 1.0 to 30.0%, Nb: 0.1 to 40.0%, Si: 0.1 to 2.0%, Fe: 0.01 to 5.0%, Cr: 0.1 to 10.0%, Cu: 0.3 to 3.0%, Co: 0.05 to 3.0%, Ni: 0.05 to 2.0%, platinum group elements: 0.01 to 0.5%, rare earth elements: 0.001 to 0.5%, B: 0.01 to 5.0%, and Mn: 0.1 to 10.0%.

More preferably, the titanium alloy according to the present invention contains one or more types of element selected from: O: 0.02 to 0.4%, N: 0.01 to 0.15%, C: 0.01 to 1.0%, Al: 0.2 to 6.0%, Sn: 0.15 to 5.0%, Zr: 0.5 to 10.0%, Mo: 0.2 to 20.0%, Ta: 0.1 to 3.0%, V: 2.0 to 25.0%, Nb: 0.15 to 5.0%, Si: 0.1 to 1.0%, Fe: 0.05 to 2.0%, Cr: 0.2 to 5.0%, Cu: 0.3 to 2.0%, Co: 0.05 to 2.0%, Ni: 0.1 to 1.0%, platinum group elements: 0.02 to 0.4%, rare earth elements: 0.001 to 0.3%, B: 0.1 to 5.0%, and Mn: 0.2 to 8.0%, and further preferably contains one or more types of element selected from: O: 0.03 to 0.3%, N: 0.01 to 0.1%, C: 0.01 to 0.5%, Al: 0.4 to 5.0%, Sn: 0.2 to 3.0%, Zr: 0.5 to 5.0%, Mo: 0.5 to 15.0%, Ta: 0.2 to 2.0%, V: 5.0 to 20.0%, Nb: 0.2 to 2.0%, Si: 0.15 to 0.8%, Fe: 0.1 to 1.0%, Cr: 0.2 to 3.0%, Cu: 0.3 to 1.5%, Co: 0.1 to 1.0%, Ni: 0.1 to 0.8%, platinum group elements: 0.03 to 0.2%, rare earth elements: 0.001 to 0.1%, B: 0.2 to 3.0%, and Mn: 0.2 to 5.0%.

TABLE 1

| Element | Preferable range (mass %) | More preferable range | Further preferable range | Main role Purpose |
| --- | --- | --- | --- | --- |
| O | 0.01~0.5 | 0.02~0.4 | 0.03~0.3 | Strength improvement |
| N | 0.01~0.2 | 0.01~0.15 | 0.01~0.1 | Strength improvement |
| C | 0.01~2.0 | 0.01~1.0 | 0.01~0.5 | Strength improvement |
| Al | 0.1~8.0 | 0.2~6.0 | 0.4~5.0 | Strength improvement |
| Sn | 0.1~10.0 | 0.15~5.0 | 0.2~3.0 | Strength improvement |
| Zr | 0.5~20.0 | 0.5~10.0 | 0.5~5.0 | Strength and workability improvement |
| Mo | 0.1~25.0 | 0.2~20.0 | 0.5~15.0 | High-temperature strength and corrosion resistance improvement |
| Ta | 0.1~5.0 | 0.1~3.0 | 0.2~2.0 | Heat resistance, corrosion resistance improvement |
| V | 1.0~30.0 | 2.0~25.0 | 5.0~20.0 | Strength improvement, microstructure control |
| Nb | 0.1~40.0 | 0.15~5.0 | 0.2~2.0 | Heat resistance, strength improvement |
| Si | 0.1~2.0 | 0.1~1.0 | 0.15~0.8 | Heat resistance improvement |
| Fe | 0.01~5.0 | 0.05~2.0 | 0.1~1.0 | Strength improvement, microstructure control |
| Cr | 0.1~10.0 | 0.2~5.0 | 0.2~3.0 | Strength improvement |
| Cu | 0.3~3.0 | 0.3~2.0 | 0.3~1.5 | Strength and workability improvement |
| Co | 0.05~3.0 | 0.05~2.0 | 0.1~1.0 | Corrosion resistance improvement, strength improvement |
| Ni | 0.05~2.0 | 0.1~1.0 | 0.1~0.8 | Corrosion resistance improvement, strength improvement |
| Platinum group elements such as Pt and Pd | 0.01~0.5 | 0.02~0.4 | 0.03~0.2 | Corrosion resistance improvement |
| Rare earth elements such as Sc and Y, mixed rare earth elements (misch metal) | 0.001~0.5 | 0.001~0.3 | 0.001~0.1 | Corrosion resistance inprovement |
| B | 0.01~5.0 | 0.1~5.0 | 0.2~3.0 | Neutron shielding performance improvement |
| Mn | 0.1~10.0 | 0.2~8.0 | 0.2~5.0 | Strength improvement |

Further, for example, titanium alloys specified in JIS Standards that are described hereunder can also be used.

JIS Class 11 to JIS Class 23 (JIS 4600 (2012) Titanium and titanium alloys—Sheets, plates and strips): include Pd, Ru, Ni, Co or the like, and are excellent in corrosion resistance and crevice corrosion resistance.

JIS Class 50 (JIS 4600 (2012) Titanium and titanium alloys—Sheets, plates and strips): is Ti-1.5Al, and is excellent in corrosion resistance, hydrogen absorption resistance and heat resistance.

JIS Class 60 (JIS 4600 (2012) Titanium and titanium alloys—Sheets, plates and strips): is Ti-6Al-4V, and is a high strength titanium alloy with a high degree of versatility.

JIS Class 61 (JIS 4600 (2012) Titanium and titanium alloys—Sheets, plates and strips): is Ti-3Al-2.5V, and provides favorable weldability and formability and favorable machinability.

JIS Class 80 (JIS 4600 (2012) Titanium and titanium alloys—Sheets, plates and strips): is Ti-4Al-22V, and is a high strength titanium alloy that is excellent in cold workability.

Furthermore, apart from the above described titanium alloys, a titanium alloy having a chemical composition that is not specified in JIS Standards can also be used. Examples of such titanium alloys are listed below.

Titanium alloys having heat resistance: Ti-6Al-2Sn-4Zr-2Mo-0.08Si, Ti-6Al-5Zr-0.5Mo-0.2Si, Ti-8Al-1Mo-1V, and the like.

Low-alloy, high-strength titanium alloys: Ti-1 to 1.5Fe-0.3 to 0.50-0.01 to 0.04N and the like.

Low-alloy titanium alloys having heat resistance: Ti-1Cu, Ti-1Cu-0.5Nb, Ti-1Cu-1Sn-0.35Si-0.5Nb, and the like.

Titanium alloys excellent in creep resistance: Ti-6Al-2Sn-4Zr-6Mo and the like.

Titanium alloys having high strength and good cold workability: Ti-15V-3Cr-3Sn-3Al, Ti-20V-4Al-1Sn, and the like.

Titanium alloys having high strength and high toughness: Ti-10V-2Fe-3A and the like.

Titanium alloys excellent in wear resistance: Ti-6Al-4V-10Cr-1.3C and the like.

Preferably, at least one of the first surface layer portion 2 and the second surface layer portion 3 (at least a surface layer portion that contacts the external environment) contains alloying elements that express a target characteristic, with the balance being Ti and impurities. The following elements are exemplified as alloying elements that express a target characteristic, although the present invention is not limited to these elements.

(a) Alloying elements exhibiting corrosion resistance: by mass %, 0.01 to 0.25% of platinum group elements (Pd and/or Ru), and as required, 0.2% or less of rare earth elements, and furthermore, one or more types of element selected from Co: 0.8% or less and Ni: 0.6% or less, and the like.

(b) Alloying elements exhibiting oxidation resistance: one or more types of element selected from 0.10 to 0.60% of Si, 0.1 to 2.0% of Nb, 0.3 to 1.0% of Ta, and 0.3 to 1.5% of Al, and as required, one or more types of element selected from 1.5% or less of Sn, 1.5% or less of Cu, and 0.5% or less of Fe (however, in an amount of 2.5% or less in total).

(c) Alloying elements exhibiting fatigue resistance: one or more types of element selected from Fe, Cr, Ni, Al and Zr in a total amount of 0.08 to 1.0%.

(d) Alloying elements exhibiting hydrogen embrittlement resistance: one or more types of element selected from Mo, V and Nb in a range of 8.0<Mo equivalent<20.0 (where, Mo equivalent=Mo content (mass %)+V content (mass %)/1.5+Nb content (mass %)/3.6).

(e) Alloying element exhibiting neutron blocking properties: 0.1 to 3.0% of B.

The respective cases described in the foregoing (a) to (e) will now be individually described.

(a) Case of Containing Alloying Elements Exhibiting Corrosion Resistance (Thickness)

If the thickness of surface layer portion contacting the external environment among the first surface layer portion 2 and the second surface layer portion 3 is too thin, corrosion resistance will not be adequately obtained, Although the thickness of the first surface layer portion 2 and the second surface layer portion 3 changes depending on the thickness of the material that is used for production and also on a working ratio thereafter, a sufficient effect is exerted if the thickness is 2 μm or more. Therefore, a thickness of at least one of the first surface layer portion 2 and the second surface layer portion 3 (at least a surface layer portion that contacts the external environment) is preferably 2 μm or more, and more preferably 5 μm or more.

On the other hand, although there is not a problem with respect to corrosion resistance if the first surface layer portion 2 and the second surface layer portion 3 are thick, the cost benefit will decrease since the proportion that the titanium alloy occupies with respect to the entire titanium composite material will increase. Therefore, the thickness of the first surface layer portion 2 and the second surface layer portion 3 with respect to the overall thickness of the titanium composite material 1 is preferably 40% or less, respectively, and more preferably is 30% or less.

The thickness of the first surface layer portion 2 and the second surface layer portion 3 of the titanium composite material 1 depend on the thickness of a titanium alloy product constituting a package 6 described later and on a working ratio in hot working performed thereafter. For example, when a titanium composite material 1 having a thickness of 5 mm is produced by hot working a titanium material 5 for hot working having a thickness of 75 mm (simply referred to as a "titanium material 5" in the following description) including the package 6 constituted by titanium materials having a thickness of 10 mm, the thickness of each of the first surface layer portion 2 and the second surface layer portion 3 in the titanium composite material 1 is about 667 μm, accounting for about 13% of the overall thickness of the titanium composite material 1.

(Chemical Composition)

The titanium composite material 1 according to the present invention may contain various alloying elements described hereunder to increase the corrosion resistance of at least one of the first surface layer portion 2 and the second surface layer portion 3 (at least a surface layer portion that contacts the external environment).

Platinum Group Elements: 0.01 to 0.25%

A platinum group element has an effect that lowers the hydrogenation voltage of a titanium alloy and maintains the spontaneous potential in an immobile zone, and can be contained as an alloying element that exhibits corrosion resistance. The corrosion resistance will be insufficient if the content of the platinum group element (total content in a case where a plurality of platinum group elements is contained) is less than 0.01%. Even if the content is more than 0.25%, a significant improvement in corrosion resistance cannot be expected, and a content of more than 0.25% leads to a steep rise in the raw material cost. In the case of containing platinum group elements, the content thereof is made 0.01 to 0.25%. Preferably the content of platinum group elements is 0.03% or more, more preferably is 0.05% or more, and a content of 0.20% or less is preferable, and more preferably is 0.15% or less.

Although the platinum group elements that may be used in the present invention are all useful elements that have an effect that increases corrosion resistance of the titanium alloy, in particular it is preferable to contain Pd for which the advantageous effect of improving corrosion resistance is high per percentage content. Further, Ru which is relatively inexpensive can be used as a substitute for Pd.

If a rare earth elements are added to a titanium alloy containing a platinum group element, the Ti and platinum group element will be rapidly eluted when exposed to a corrosive environment, and the concentration of the platinum group element in a solution in the vicinity of the titanium alloy will increase. As a result, precipitation of the platinum group element in the titanium alloy will be promoted, and the platinum group element can be efficiently precipitated even if the dissolved amount of titanium alloy is small, and this leads to an improvement in corrosion resistance.

Rare Earth Elements: 0 to 0.2%

Rare earth elements include Sc, Y, light rare earth elements (La to Eu), and heavy rare earth elements (Gd to Lu), and the above effect can be expected when any of the rare earth elements are added. The same effect can also be expected in a case where a mixture or compound of rare earth elements are used, such as mixed rare earth elements before separation and refining (misch metal, hereinafter simply referred to as "Mm") or a didymium alloy (Nd—Pr alloy).

Taking into account the circumstances described above, it is not necessary for the rare earth element that is added to be of only one kind, and it is considered that corrosion resistance will be improved by the above effect even if a plurality of elements are contained at the same time. In such a case, the total content of rare earth elements means the total content of the aforementioned elements.

If the content of rare earth elements is excessive, the above effect is saturated, and hence not only will a further advantageous effect of improving corrosion resistance not be obtained, but the economic efficiency will also decrease. Therefore, in the case of containing rare earth elements, the content thereof is preferably 0.2% or less and more preferably is 0.02% or less. On the other hand, in order to adequately obtain an advantageous effect of eluting Ti and platinum group elements in an active state area of the titanium alloy and to promote precipitation of the platinum group elements onto the alloy surface, it is preferable to contain 0.001% or more of rare earth elements.

Co: 0 to 0.8%

Ni: 0 to 0.6%

Co and Ni are elements that improve the corrosion resistance of the titanium alloy by changing a hydrogenation voltage, and extremely high corrosion resistance is obtained by adding Co and Ni in combination with a platinum group element and/or a rare earth elements. However, even if the Co content is more than 0.8% or the Ni content is more than 0.6%, the effect is saturated, and this is not preferable from a viewpoint of economic efficiency also. Therefore, when these elements are contained, the Co content is made 0.8% or less and the Ni content is made 0.6% or less. The Co content is preferably 0.7% or less, and the Ni content is preferably 0.5% or less. To reliably obtain the above effect, it is preferable to contain 0.05% or more of each of Co and Ni, and containing 0.2% or more of each of Co and Ni is more preferable.

The balance other than the above elements is Ti and impurities. The impurities can be contained in a range that does not inhibit the target characteristics, and other impurities include Cr, Ta, Al, V, Cr, Nb, Si, Sn, Mn, Mo, Cu, and the like as impurity elements that get mixed in mainly from scrap, and impurities are allowed as long as the amount thereof together with C, N, Fe, O and H that are the common impurity elements is 0.5% or less.

(b) Case of Containing Alloying Elements Exhibiting Oxidation Resistance (Thickness)

If the thickness of a surface layer portion contacting the external environment among the first surface layer portion 2 and the second surface layer portion 3 is too thin, oxidation resistance will not be adequately obtained. Although the thickness of the first surface layer portion 2 and the second surface layer portion 3 changes depending on the thickness of the material that is used for production and also on a working ratio thereafter, a sufficient effect is exerted if the thickness is 5 μm or more. Therefore, a thickness of at least one of the first surface layer portion 2 and the second surface layer portion 3 (at least a surface layer portion that contacts the external environment) is preferably 5 μm or more, and more preferably 10 μm or more.

On the other hand, although there is not a problem with respect to oxidation resistance if the first surface layer portion 2 and the second surface layer portion 3 are thick, the cost benefit will decrease since the proportion that the titanium alloy occupies with respect to the entire titanium composite material will increase. Therefore, the thickness of the first surface layer portion 2 and the second surface layer portion 3 with respect to the overall thickness of the titanium composite material 1 is preferably 40% or less, respectively, and more preferably is 30% or less.

The thickness of the first surface layer portion 2 and the second surface layer portion 3 of the titanium composite material 1 depend on the thickness of a titanium alloy product constituting a package 6 described later and on a working ratio in hot working performed thereafter. For example, when a titanium composite material 1 having a thickness of 5 mm is produced by hot working the titanium material 5 for hot working having a thickness of 250 mm including the package 6 constituted by titanium materials having a thickness of 1 mm, the thickness of the titanium alloy layer of each of the first surface layer portion 2 and the second surface layer portion 3 in the titanium composite material 1 is about 20 μm, accounting for about 0.4% of the overall thickness of the titanium composite material 1.

(Chemical Composition)

The oxidation of titanium takes an oxidation form so-called inward diffusion, in which oxygen diffuses in an oxidized film to bind to titanium on a surface. Therefore, if the diffusion of oxygen is suppressed, the oxidation is suppressed. For a titanium alloy, in the case of improving an oxidation resistance at a high temperature of 600 to 800° C., an alloying element such as Si and Nb is added.

The addition of Si causes silicon oxides to form in an outer layer to make a barrier when exposed to an atmosphere at a high temperature, diffusion of oxygen to the inside of titanium is suppressed, and the oxidation resistance is improved. Further, while Ti is tetravalent, Nb is pentavalent. Therefore, Nb dissolving in an oxidized coating of titanium decreases the concentration of oxygen holes in the oxidized film, and the diffusion of oxygen in the oxidized film is suppressed.

The titanium composite material 1 according to the present invention may contain various alloying elements described hereunder to increase the oxidation resistance of at least one of the first surface layer portion 2 and the second surface layer portion 3 (at least a surface layer portion that contacts the external environment).

Si: 0.10 to 0.60%

Si has an action that improves oxidation resistance at a high temperature of 600 to 800° C. If the Si content is less than 0.10%, the degree of improvement in oxidation resistance will be small. On the other hand, if the Si content is more than 0.60%, the influence on oxidation resistance will be saturated and workability will noticeably decline not only at room temperature but also at a high temperature. Hence, in a case where Si is to be contained, the content thereof is made 0.10 to 0.60%. An Si content of 0.15% or more is preferable, and an Si content of 0.20% or more is more preferable, and the Si content is preferably 0.50% or less, and more preferably is 0.40% or less.

Nb: 0.1 to 2.0%

Nb also has an action that improves oxidation resistance at a high temperature. In order to improve oxidation resistance, the Nb content is made 0.1% or more. On the other hand, even if the Nb content contained in the titanium alloy is more than 2.0%, the effect will be saturated, and this will also cause an increase in the alloy cost since Nb is an expensive additional element. Hence, in a case where Nb is to be contained, the content thereof is made 0.1 to 2.0%. The Nb content is preferably 0.3% or more, more preferably is 0.5% or more, and the Nb content is preferably 1.5% or less, and more preferably is 1.2% or less.

Ta: 0.3 to 1.0%

Ta also has an action that improves oxidation resistance at a high temperature. In order to improve oxidation resistance, the Ta content is made 0.3% or more. On the other hand, if the Ta content contained in the titanium alloy is more than 1.0%, not only will this cause an increase in the alloy cost since Ta is an expensive additional element, but formation of β phase by a heat treatment temperature is also a concern. Hence, in a case where Ta is to be contained, the content thereof is made 0.3 to 1.0%. The Ta content is preferably 0.4% or more, more preferably is 0.5% or more, and the Ta content is preferably 0.9% or less, and more preferably is 0.8% or less.

Al: 0.3 to 1.5%

Al is also an element that improves oxidation resistance at a high temperature. On the other hand, if Al is contained in a large amount, ductility at room temperature noticeably decreases. An oxidation resistance property is sufficiently exhibited if the Al content is 0.3% or more. Further, if the Al content is 1.5% or less, working performed as cold processing can be sufficiently ensured. Hence, in a case where Al is to be contained, the content thereof is made 0.3 to 1.5%. The Al content is preferably 0.4% or more, more preferably is 0.5% or more, and the Al content is preferably 1.2% or less.

Note that, although oxidation resistance is improved if any one of Si, Nb, Ta and Al is individually contained, high temperature oxidation resistance can be further improved by containing a combination of these elements.

In addition to the above elements, one or more types of element selected from Sn, Cu and Fe may be contained.

Sn: 0 to 1.5%

Sn is an α phase stabilizing element, and similarly to Cu, is an element that increases high temperature strength. However, if the Sn content is more than 1.5%, the Sn inhibits twinning deformation and reduces workability at room temperature. Therefore, in a case where Sn is to be contained, the content thereof is made 1.5% or less. The Sn content is preferably 1.2% or less. When it is desired to obtain the aforementioned effect, the Sn content is preferably 0.2% or more, and more preferably is 0.4% or more.

Cu: 0 to 1.5%

Cu is an element that increases high temperature strength. Further, since Cu dissolves to a fixed degree in α phase, Cu does not form 0 phase even when used at a high temperature. However, if the Cu content is more than 1.5%, the Cu may form p phase depending on the temperature. Therefore, in a case where Cu is to be contained, the content thereof is made 1.5% or less. The Cu content is preferably 1.4% or less, and more preferably is 1.2% or less. When it is desired to obtain the aforementioned effect, the Cu content is preferably 0.2% or more, and more preferably is 0.4% or more.

Fe: 0 to 0.5%

Although Fe is a β phase stabilizing element, if Fe is contained in a small amount, there is little formation of β phase, and the Fe will not significantly affect oxidation resistance. However, if the Fe content is more than 0.5%, the formed amount of β phase is large, causing oxidation resistance to deteriorate. Therefore, in a case where Fe is to be contained, the content thereof is made 0.5% or less. Preferably the Fe content is 0.4% or less, and more preferably is 0.3% or less.

If the total content of Sn, Cu and Fe is more than 2.5%, these elements will decrease the workability at room temperature, and depending on the temperature, β phase may be formed. Therefore, in a case where one or more types of element selected from Sn, Cu and Fe is to be contained, preferably the total content thereof is not more than 2.5%.

The balance other than the above elements is Ti and impurities. The impurities can be contained in a range that does not inhibit the target characteristics, and other impurities include Cr, V, Mn, Mo, and the like as impurity elements that get mixed in mainly from scrap, and impurities are allowed as long as the amount thereof together with C, N, O and H that are the common impurity elements is 5.0% or less.

(c) Case of Containing Alloying Elements Exhibiting Fatigue Resistance (Thickness)

If the thickness of a surface layer portion of the first surface layer portion 2 and the second surface layer portion 3 contacting the external environment among the outer layers is too thin, fatigue resistance will not be adequately obtained. Although the thickness of the first surface layer portion 2 and the second surface layer portion 3 changes depending on the thickness of the material that is used for production and also on a working ratio thereafter, a sufficient effect is exerted if the thickness is 5 μm or more. Therefore, a thickness of at least one of the first surface layer portion 2 and the second surface layer portion 3 (at least a surface layer portion that contacts the external environment) is preferably 5 μm or more, and more preferably 10 km or more. Further, the thickness of the first surface layer portion 2 and the second surface layer portion 3 with respect to the overall thickness of the titanium composite material 1 is preferably 1% or more, respectively.

On the other hand, although there is not a problem with respect to fatigue resistance if the first surface layer portion 2 and the second surface layer portion 3 are thick, formability will decrease. Further, because the proportion that the titanium alloy occupies with respect to the entire titanium composite material will increase, the cost benefit will decrease. Therefore, the thickness of each of the first surface layer portion 2 and the second surface layer portion 3 is preferably 100 µm or less, and more preferably is 50 µm or less. Further, the thickness of the first surface layer portion 2 and the second surface layer portion 3 with respect to the overall thickness of the titanium composite material 1 is preferably 20% or less, respectively, and more preferably is 10% or less.

(Chemical Composition)

The titanium composite material 1 according to the present invention may contain various alloying elements described hereunder to increase the fatigue resistance of at least one of the first surface layer portion 2 and the second surface layer portion 3 (at least a surface layer portion that contacts the external environment).

One or more types of element selected from Fe, Cr, Ni, Al and Zr: 0.08 to 1.0%

Because the origin of fatigue fracture is the surface of a sheet product, it is preferable to make the α-phase grain diameter 15 µm or less to obtain high fatigue resistance while maintaining formability. The α-phase grain diameter is more preferably made 10 µm or less, and further preferably is made 5 µm or less.

In order to make the α-phase grain diameter 15 µm or less and obtain high fatigue resistance, the total content of Fe, Cr, Ni, Al and Zr is made 0.08% or more. On the other hand, if the total content of these elements is more than 1.0%, in some cases the ductility such as elongation and formability significantly decreases. Therefore, the total content of one or more types of element selected from Fe, Cr, Ni, Al and Zr is made 0.08 to 1.0%.

The balance other than the above elements is Ti and impurities. The impurities can be contained in a range that does not inhibit the target characteristics, and other impurities include Sn, Mo, V, Mn, Nb, Si, Cu, Co, Pd, Ru, Ta, Y, La, Ce, and the like as impurity elements that get mixed in mainly from scrap, and impurities are allowed as long as the amount thereof together with C, N, O and H that are the common impurity elements is 5.0% or less.

(Mechanical Properties)

The titanium composite material 1 has high fatigue strength while also maintaining excellent formability, with the fatigue strength ratio ($10^7$ cycles fatigue strength/tensile strength) being 0.65 or more. The higher that the fatigue strength ratio is, the more excellent the material is in fatigue characteristics, and since this value is generally from 0.5 to 0.6 for a titanium material, it can be said that if the value is 0.65 or more the fatigue characteristics are superior in comparison to a common titanium material, and if the value is 0.70 or more it can be said that the fatigue characteristics are further superior.

In addition, in the titanium composite material 1, breaking elongation in a direction perpendicular to the rolling direction is 25% or more. Elongation has a significant influence on forming, and the greater the elongation is, the more excellent the formability that is exhibited.

(d) Case of Containing Alloying Elements Exhibiting Hydrogen Embrittlement Resistance (Thickness)

If the thickness of a surface layer portion of the first surface layer portion 2 and the second surface layer portion 3 contacting the external environment among the outer layers is too thin, hydrogen absorption resistance will not be adequately obtained. On the other hand, although there is not a problem with respect to hydrogen absorption resistance if the titanium alloys in the first surface layer portion 2 and the second surface layer portion 3 are thick, since the proportion that the titanium alloys in the first surface layer portion 2 and the second surface layer portion 3 occupy with respect to the entire material will increase, the production cost will rise. Therefore, a thickness of at least one of the first surface layer portion 2 and the second surface layer portion 3 with respect to the overall thickness of the titanium composite material 1 (at least a surface layer portion that contacts the external environment) is made 2 to 20%.

The thickness of the first surface layer portion 2 and the second surface layer portion 3 of the titanium composite material 1 depend on the thickness of a titanium alloy product constituting a package 6 described later and on a working ratio in hot working performed thereafter. For example, when a titanium composite material 1 having a thickness of 5 mm is produced by hot working the titanium material 5 for hot working having a thickness of 60 mm including the package 6 constituted by titanium materials having a thickness of 5 mm, the thickness of the titanium alloy layer of each of the first surface layer portion 2 and the second surface layer portion 3 in the titanium composite material 1 is about 0.4 mm, accounting for about 8% of the overall thickness of the titanium composite material 1.

(Chemical Composition)

The titanium composite material 1 according to the present invention may contain various alloying elements described hereunder to increase the hydrogen absorption resistance of at least one of the first surface layer portion 2 and the second surface layer portion 3 (at least a surface layer portion that contacts the external environment).

$$8.0 < \text{Mo equivalent} < 20.0$$

Where, Mo equivalent=Mo content (mass %)+V content (mass %)/1.5+Nb content (mass %)/3.6.

A layer that obtains hydrogen absorption resistance is a titanium alloy layer containing β stabilizing elements in a fixed range. The reason for defining formation of the β phase is that, while the α phase of titanium forms hydrides with even a very small hydrogen concentration of several 10 ppm, the β phase of a titanium alloy can dissolve hydrogen of approximately 1000 ppm or more, and hence has a characteristic such that it is difficult for embrittlement that is caused by hydrogen to occur.

In a case where eutectoid β stabilizing elements such as Fe and Cr are contained, there is a risk of titanium and these elements forming a compound and causing embrittlement. However, in a case where, among the § stabilizing elements, Mo, V and Nb are contained within a range that satisfies "8.0<Mo equivalent<20.0", even if Fe and Cr or the like are simultaneously present, embrittlement does not occur because the β phase is stable and does not form a compound phase.

Here, the lower limit of the Mo equivalent is an alloy amount required to obtain a sufficient amount of β phase. The upper limit is set based on the fact that a titanium alloy in which the amount of added alloying elements is large is not suitable for use from a cost aspect since the price thereof is high. Note that titanium alloy products used as the package 6 are not necessarily of β phase, and it suffices that β phase surrounds α phase even if α phase precipitates in β phase.

An existing p-type titanium alloy can be utilized in the package 6 described below, for the formation of alloy layers as the first surface layer portion 2 and the second surface layer portion 3. Examples thereof include Ti-15V-3Cr-3Al-3Sn, Ti-8V-3Al-6Cr-4Mo-4Zr (BetaC) and Ti-11.5Mo-6Zr- 4.5Sn (BetaIII). In the case of using such an existing β-type titanium alloy in the package 6, such elements are allowed if the amount thereof together with the content of additional elements, such as Cr, Sn, Al and Zr, that are other than the aforementioned elements is 15% or less. These elements are elements which are contained for adjusting heat treatability, strength and cold workability in an existing β-type titanium alloy, and do not reduce the Mo equivalent defined in the present invention. Further, elements such as Si and Fe, for example, may also be contained.

The balance other than the above elements is Ti and impurities. Impurities can be contained in a range that does not inhibit the target characteristics, and other impurities include Ta, Si, Mn, Cu, and the like as impurity elements that get mixed in mainly from scrap, and the impurities are allowed as long as the amount thereof together with C, N, Fe, O and H that are the common impurity elements is 5% or less.

(e) Case of Containing Alloying Elements Exhibiting Neutron Blocking Properties (Thickness)

If the thickness of a surface layer portion contacting the external environment among the first surface layer portion 2 and the second surface layer portion 3 is too thin, a neutron shielding effect will not be adequately obtained. On the other hand, in a case where the first surface layer portion 2 and the second surface layer portion 3 are thick, although a neutron shielding effect improves, since the proportion that the titanium alloy occupies with respect to the entire material increases, the production cost rises. Therefore, a thickness of at least one of the first surface layer portion 2 and the second surface layer portion 3 with respect to the overall thickness of the titanium composite material 1 (at least a surface layer portion that contacts the external environment) is made 5 to 40%.

The neutron shielding effect has a correlation with the thickness of the first surface layer portion 2 and the second surface layer portion 3 with respect to the overall thickness of the titanium composite material 1 described above, and the working ratio. For example, when a titanium composite material 1 having a thickness of 10 mm is produced by hot working the titanium material 5 for hot working having a thickness of 100 mm including the package 6 having a thickness of 20 mm, the thickness of the titanium alloy layer of each of the first surface layer portion 2 and the second surface layer portion 3 in the titanium composite material 1 is 2 mm, accounting for 20% (40% in total of both portions) of the overall thickness of the titanium composite material 1.

Note that, in order to increase the thickness of the first surface layer portion 2 and the second surface layer portion 3, a sheet thickness of alloy sheets bonded together when the package 6 is produced may be increased. However, if the sheet thickness of the alloy sheets is too large, it is difficult to weld the alloy sheets to form the package 6. Therefore, the proportion of the alloy sheets may be increased relatively to the overall thickness of the titanium material 5 by decreasing an original thickness of the titanium material 5 for hot working.

(Chemical Composition)

The titanium composite material 1 according to the present invention contains an alloying element for providing a neutron shielding effect in the first surface layer portion 2 and the second surface layer portion 3. Hereunder, reasons for selecting an additional element, and reasons for limiting a range of an added amount of the additional element are described in detail.

B: 0.1 to 3.0%

The natural abundance of $^{10}B$ in B is 19.9%, and $^{10}B$ has a large absorption cross section for thermal neutrons and a neutron shielding effect thereof is large. A neutron shielding effect is not adequately obtained if the B content is less than 0.1%, and if the B content is more than 3.0% there is a risk of causing cracks and a deterioration in workability during hot rolling.

In this case, it is possible to manufacture a titanium alloy containing B by adding B or a boride such as $TiB_2$ to titanium. Furthermore, if material containing $^{10}B$ enriched boron ($^{10}B$ content is approximately 90% or more) such as $H_3{}^{10}BO_3$, $^{10}B_2O$ or $^{10}B_4C$ is used, since the neutron shielding effect is large even if the B content is small, the titanium alloy is extremely useful.

In the case of using $H_3{}^{10}BO^3$, $^{10}B_2O$ or $^{10}B_4C$, although H and O also concentrate in the alloy layer, the H does not constitute a problem since the H comes out from the material during a heat treatment such as vacuum annealing. And with respect to O and C, the material having the O content of 0.4 percent by mass or less and the C content of 0.1 percent by mass or less which are not more than the respective upper limits contained in a commercially pure titanium material can be manufactured without a problem.

The balance other than the above elements is Ti and impurities. The impurities can be contained in a range that does not inhibit the target characteristics, and other impurities include Cr, Ta, Al, V, Cr, Nb, Si, Sn, Mn, Mo, Cu and the like as impurity elements that get mixed in mainly from scrap, and impurities are allowed as long as the amount thereof together with C, N, Fe, O and H that are the common impurity elements is 5% or less.

(Applications)

In facilities in which radiation therapy such as particle radiotherapy and BNCT (boron neutron capture therapy) is performed, a polyethylene material is used in which the B content is 3.0 to 4.0 percent by mass and the sheet thickness is 10 to 100 mm. Further, in facilities related to nuclear energy, stainless steel sheets in which the B content is 0.5 to 1.5 percent by mass and the sheet thickness is 4.0 to 6.0 mm are used in nuclear fuel storage racks. By using the titanium composite material 1 in which the B content and thickness of the first surface layer portion 2 and the second surface layer portion 3 (thickness of a B-concentrated layer) are adjusted, it is possible to exert characteristics that are equal to or superior to the characteristics of the aforementioned materials.

1-3. Inner Layer Portion (Chemical Composition)

The component of a pure titanium in the inner layer portion 4 of the titanium composite material 1 depends on the component of a titanium sponge used in the production of the titanium composite material 1, as will be described hereunder. In the titanium composite material 1 according to the present invention, among the pure titaniums specified in JIS, commercially pure titaniums of JIS Class 1, JIS Class 2, JIS Class 3, or JIS Class 4 can be used. That is, commercially pure titaniums containing 0.1% or less of C, 0.015% or less of H, 0.4% or less of O, 0.07% or less of N, and 0.5% or less of Fe, with the balance being Ti can be used.

When these commercially pure titaniums of JIS Classes 1 to 4 are used, a titanium material is obtained that has a sufficient workability, does not cause a crack or the like to occur, and is integrated with a titanium alloy on the surface thereof after hot working. However, it is noted that, because titanium is an active metal, if the average particle size of a titanium sponge becomes a fine powder of 0.1 mm or less, a surface area per mass increases, and catch-up (concentration) of O is inevitable under real operation.

The O content in the inner layer portion of the titanium composite material can be adjusted depending on desired mechanical properties, and in a case where a high strength is needed, O may be contained up to its maximum of 0.4%. If the O content is more than 0.4%, a crack or the like occurs, there is a risk that the titanium material integrated with the titanium alloy on the surface after hot working is not obtained. On the other hand, in a case where ductility is required rather than strength, it is preferable to decrease the O content, and the O content is preferably 0.1% or less, and more preferably 0.05% or less.

(Porosity)

The titanium composite material 1 according to the present invention is produced by hot working and cold working using the titanium material 5 described later as a material. At such time, pores formed in the pure titanium portion in the titanium material 5 compressively bond when subjected to the hot working and the cold working but are not completely removed, and some of the pores remain in the inner layer portion 4. If the pores in this inner layer portion 4 are too many, mechanical properties (strength and ductility) for a bulk metal decrease, and the less the pores are, the more desirable it is.

However, in order to cause pores to compressively bond completely, a large rolling reduction is necessary, the shape (thickness) of the produced titanium composite material 1 is limited, and in addition, this can lead to a steep rise in producing cost. On the other hand, in a case where pores are contained to the extent that the titanium composite material 1 has sufficient mechanical properties (strength, ductility, and the like) to keep the structure of the titanium composite material 1, the density of an interior titanium decreases, and therefore the weight reduction of the produced titanium composite material 1 can be expected.

At such time, if the porosity in the inner layer portion 4 is 30% or less, the titanium composite material 1 is produced as the titanium composite material 1 in which the inner layer portion 4 is integrated with the first surface layer portion 2 and the second surface layer portion 3. In order to produce the titanium composite material 1 efficiently, hot working and cold working are preferably performed exceeding a certain amount, and the porosity at this time is 10% or less.

As seen from the above, the porosity can be selected depending on uses, for example, the porosity is decreased in a case where mechanical properties as a bulk metal are important, and the porosity is increased in a case where the weight reduction of a material is a high priority. The porosity in the inner layer portion 4 at such time is preferably more than 0% and 30% or less, and more preferably more than 0% and 10% or less.

(Method for Calculating Porosity)

The proportion of the pores remaining in the inner layer portion 4 of the titanium composite material 1 (porosity) is calculated as follows. The titanium material is embedded in a resin such that the cross section of the titanium material can be observed, and thereafter a surface of the titanium material to be observed is buffed and subjected to mirror finish using diamond or an alumina suspension. Using this sample for observation subjected to mirror finish, an optical micrograph of a center of a sheet thickness is taken at 500× magnification. The area proportion of pores observed on the taken optical micrograph is measured, and the measurement results of 20 micrographs are averaged and calculated as the porosity. Although there is not a problem with respect to using a normal optical microscope as a microscope used in the observation, it is preferable to use a differential interference contrast microscopy that is capable of polarized light observation because the differential interference contrast microscopy is capable of performing observation more clearly.

2. Material for Hot Working Made of Titanium Composite Material

Figure 2:
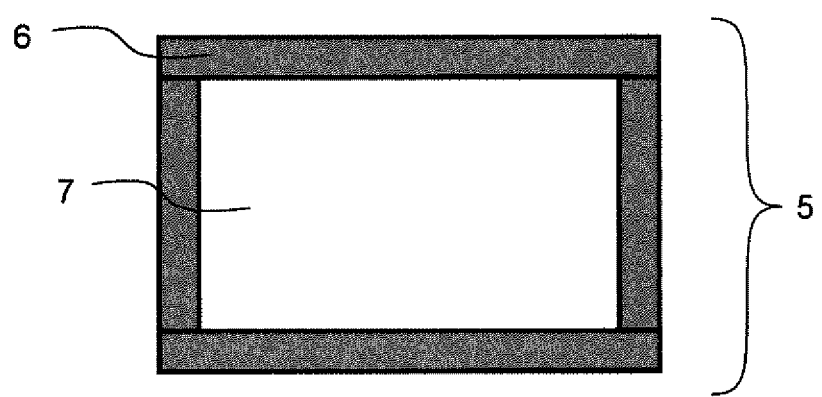
FIG. 2 is an explanatory drawing illustrating the structure of a titanium material as a material for hot working for the titanium composite material according to the present invention.

FIG. 2 is an explanatory drawing illustrating the structure of a titanium material 5 for hot working that is a material for hot working of the titanium composite material 1. The titanium composite material 1 including a first surface layer portion 2 and a second surface layer portion 3 both consisting of a titanium alloy, and an inner layer portion 4 consisting of a pure titanium, and the titanium composite material 1 is produced by, for example, forming a package 6 as illustrated in FIG. 2 by creating an sealed entire circumference with titanium alloy products having various characteristics, packing an inner portion of the package 6 with a titanium lump 7, reducing the pressure inside the package 6 to form the titanium material 5, and performing hot working on this titanium material 5 as a material for hot working. Hereunder, each structure of the material is described in detail.

2-1. Titanium Lump (Chemical Composition)

The titanium lump 7 supplied into the titanium material 5 for hot working according to the present invention is a normal titanium lump produced by a conventional smelting process such as the Kroll process, and a commercially pure titanium that is equivalent to JIS Class 1, JIS Class 2, JIS Class 3, or JIS Class 4 can be used as the component of the normal titanium lump.

(Shape)

The titanium lump 7 contains one or more types selected from a titanium sponge, a briquette obtained by compressing a titanium sponge, and a commercially pure titanium scrap. The size of the titanium lumps 7 is preferably 30 mm or less in terms of average particle size. If the average particle size is larger than 30 mm, there is a problem with respect to handling such as difficulty in handling the titanium lump 7 when transferred and difficulty in putting the titanium lumps 7 into the titanium material, and as a result, an operation efficiency becomes poor. Further, there is a possibility of decreasing a packing rate when the package 6 is packed with the titanium lump 7, and an average particle size larger than 30 mm decreases the density of the titanium composite material 1 produced by the hot working and can lead to a decrease in characteristics such as ductility.

On the other hand, if the size of the titanium lump 7 is too small, dust constitutes a problem when the package 6 is packed with the titanium lumps 7, and there is not only a risk of hindering work but also a risk of the concentration of O during handling because a surface area per mass increases. Therefore, the average particle size of the titanium lumps 7 is preferably 0.1 mm or more, and more preferably 1 mm or more.

Note that, it is considered that a pure titanium powder subjected to mechanical milling (MM) treatment is used as an extremely fine powder that has an average particle size of 0.1 mm or less. The MM treatment is a treatment in which a powder and hard balls are put in a pot and enclosed, and the powder is subjected to particle refining by vibrating a pot mill. The surface of the refined particle after the MM treatment is in an active state, and therefore it is necessary to handle the fine particle in an inert gas such that O and N in atmospheric air are not absorbed when the pure titanium powder is collected from the pot.

Further, if a pure titanium having low concentrations of O and N is subjected to the MM treatment, since the pure titanium has a high ductility, powders compressively bond, or the pure titanium compressively bonds to the hard balls or the surface of the pot. Therefore, a problem of a poor yield of the pure titanium powder obtained by performing the MM treatment arises. For such a reason, manufacturing a pure titanium powder by the MM treatment needs enormous labors and expenses and unsuitable for volume production.

There is a method in which a titanium fine particle is produced from a titanium sponge by a hydrogenation-dehydrogenation method. However, the surface area per mass increases, the O concentration is easy to increase by surface oxidation, and therefore it is difficult to control a material quality. Consequently, the method according to the present invention in which a titanium sponge is used as it is, is excellent in terms of quality and cost.

Note that in the case of using a titanium sponge as a briquette by press molding, a portion or all of the titanium sponge may be substituted with a scrap (pure titanium scrap) or a titanium powder.

2-2. Package (Chemical Composition)

A titanium alloy having the alloy component described above is used such that the titanium alloy constitutes of a titanium alloy of the first surface layer portion 2 and the second surface layer portion 3 of the titanium composite material 1 that is an end product.

(Shape)

Since the shape of the titanium alloy product used as the package 6 depends on the shape of the titanium material 5 used as a material for hot working, the titanium alloy product has no special fixed form, and a sheet product, a shell, or the like can be used. However, in order to make the titanium composite material 1 produced by way of a producing process of hot working, cold working, annealing, or the like have greater functionality by alloying an outer layer, and to provide an excellent surface texture to the titanium composite material 1, the thickness of a titanium alloy product used for the package 6 is important.

If the titanium alloy product is thin and has a thickness of less than 1 mm, the package 6 ruptures in the middle of the hot working as plastic deformation is performed, a vacuum is lost, and the loss of vacuum causes the oxidation of the titanium lump 7 inside. Further, the roughness of the titanium lump 7 packing inside the titanium material 5 is transferred to the surface of the titanium material 5, and a large surface roughness occurs on the surface of the titanium material 5 during the hot working. These consequently have an adverse effect on the mechanical properties of the produced titanium composite material 1 such as surface texture and ductility and further on desired characteristics.

Further, also in a case where the surface defect does not occur during the hot working and the cold working, the thickness of a titanium alloy portion in the produced titanium composite material 1 is locally reduced, and there is a possibility that sufficient characteristics cannot be exerted. Further, if the package 6 is excessively thin, the package 6 cannot support the weight of the titanium lump 7 packing inside, the titanium material 5 decreases in stiffness during retention or working at a room temperature or as a hot processing, and the titanium material 5 is deformed.

If the thickness of the titanium alloy product used for the package 6 is 1 mm or more, the hot working can be performed without these problems occurring, and it is possible to produce the titanium composite material 1 provided with an excellent surface texture and desired characteristics. Note that it is more preferable to make the thickness of the titanium alloy product 2 mm or more.

On the other hand, if the thickness of the titanium alloy product is too large, the proportion of the package 6 occupying with respect to the produced titanium material 5 for hot working increases, the proportion of the titanium lump 7 occupying with respect to the titanium material 5 relatively decreases, therefore a yield decreases, and the cost is high.

2-3. Titanium Material for Hot Working

Next, the titanium material 5 produced using the titanium lump 7 and the package 6 described above is described.

(Shape)

The shape of the titanium material 5 is not limited to a specific shape but determined by the shape of the produced titanium composite material 1. In the case of intending the production of a sheet product, a titanium material 5 having a rectangular-parallelepiped shape is produced, and in the case of intending the production of a round bar, a wire rod, or an extruded material, a titanium material 5 having a polygonal-prism shape such as a columnar shape and an octagonal prism is produced. The size of the titanium material 5 is determined by the size of the product (thickness, width, length) and the amount of producing (weight).

(Inner Portion)

In the inner portion of the titanium material 5 the entire circumference of which is sealed with the package 6 is packed with the titanium lumps 7. Since the titanium lumps 7 are massive grains, there are spaces (crevices) between the grains. To improve the handling ability of the titanium lump 7 and to reduce these crevices, the titanium lumps 7 may be put in the titanium material 5 after subjected to compression molding, in advance. If air remains in the crevices in the titanium material 5, the titanium lumps 7 are oxidized or nitrided during heating before the hot working, and the ductility of the produced titanium composite material 1 decreases. Therefore, the pressure inside the titanium material 5 is reduced to increase the degree of vacuum.

(Degree of Vacuum)

In order to prevent the titanium lumps 7 from being oxidized or nitrided in hot working, the degree of vacuum of the inner portion of the titanium material 5 is made 10 Pa or less, and preferably 1 Pa or less. If the internal pressure of the titanium material 5 (absolute pressure) is more than 10 Pa, the titanium lumps 7 are oxidized or nitrided by residual air. Although the lower limit of the degree of vacuum is not particularly limited, making the degree of vacuum extremely small causes an increase in producing cost due to the improvement of airtightness of a device, the enhancement of a vacuum pumping device, and the like, and therefore, it is not necessary to make the degree of vacuum less than $1 \times 10^{-3}$ Pa.

(Welding)

As a method for welding the package 6, arc welding such as tungsten inert gas welding and metal inert gas welding, electron beam welding, laser welding, or the like can be used, and the method is not particularly limited. However, in order to prevent the surfaces of the titanium lumps 7 and the package 6 from being oxidized or nitrided, a welding atmosphere is a vacuum atmosphere or an inert gas atmosphere. In a case where the seams of the package 6 are welded last, the titanium material 5 is welded with the titanium material 5 put into a container (chamber) of a vacuum atmosphere, it is preferable to keep the vacuum of the inner portion of the titanium material 5.

3. Method for Producing Titanium Composite Material

Next, a method for producing the titanium composite material 1 in which hot working is performed on the titanium material 5 according to the present invention described above as a material for hot working is described.

The titanium composite material (product) 1 is formed by hot working the titanium material 5 as a material for hot working. A method of hot working can be selected depending on the shape of the product.

In the case of producing a sheet product, a titanium material 5 having a rectangular-parallelepiped shape (slab) is heated and subjected to hot rolling to be formed into a titanium sheet. As is the case with a conventional process, as required, after the hot rolling, an oxidized layer on the surface of the titanium sheet may be removed by pickling, and thereafter, the titanium sheet may be subjected to cold rolling and worked to be thinner.

In the case of producing a round bar or a wire rod, a titanium material 5 having a cylindrical-column or polygonal shape (billet) is heated and subjected to hot rolling or hot extrusion to be formed into a titanium round bar or wire rod. Further, as required, similarly to a conventional process, after the hot working, the oxidized layer of the titanium round bar or wire rod may be removed by pickling, and thereafter, the titanium round bar or wire rod may be subjected to cold rolling and worked to be thinner.

In addition, in the case of producing an extruded shape, a titanium material 5 having a cylindrical-column or polygonal shape (billet) is heated and subjected to hot extrusion to be formed into a titanium profile varying in cross-sectional shape.

A heating temperature similar to that of a case of performing hot working on a normal titanium slab or billet may be employed as the heating temperature before the hot working. Although differing depending on the size of the titanium material 5 or a degree (working ratio) of the hot working, the heating temperature before the hot working is preferably made 600° C. or more and 1200° C. or less. If the heating temperature is too low, the high temperature strength of the titanium material 5 becomes too high and leads to a crack during hot working, and further, attachment of the titanium lump 7 and the package (titanium alloy portion) 6 is insufficient. On the other hand, if the heating temperature is too high, the microstructure of the obtained titanium composite material 1 becomes coarse, sufficient material characteristics are not obtained, and further, the thickness of the package (titanium alloy portion) 6 on the surface of titanium composite material 1 is reduced by oxidation. If the heating temperature is made 600 to 1200° C., the hot working can be performed without such a problem occurring.

The degree of working in the hot working, that is, a working ratio can be selected for controlling the porosity of the inner portion of the titanium composite material 1. The working ratio mentioned herein is a proportion (percentage) obtained by dividing the difference between cross-sectional area of the titanium material 5 and the cross-sectional area the titanium composite material 1 after the hot working, by the cross-sectional area of the titanium material 5.

In a case where the working ratio is low, crevices between the titanium lumps 7 in the inner portion of the titanium material 5 do not compressively bond adequately and remain as pores after the hot working. The titanium composite material 1 including many such pores becomes light by the included pores. However, because the pores are present in the inner portion, the mechanical properties cannot exert adequately. On the other hand, as the working ratio increases, the porosity decreases, and the mechanical properties are improved. Consequently, in a case where importance is placed on the mechanical properties of the titanium composite material 1 to be produced, the higher the working ratio is, the more preferable it is.

Specifically, when the working ratio is 90% or more, crevices in grain boundaries between the titanium lumps 7 in the inner portion of the titanium material 5 can compressively bond adequately, and the pores in titanium composite material 1 can be reduced. Although the higher the working ratio is, the more reliably the pores in the titanium composite material 1 are destroyed, and it is preferable, it is necessary to increase the cross-sectional area of the titanium material 5, and further, it is necessary to repeat the hot working over and over again. As a result, there is a problem of a long production time or the like, and therefore the working ratio is preferably made 99.9% or less.

Hereunder, the present invention is more specifically described with reference to Examples, but the present invention is not limited to these Examples.

Example 1

Example 1-1

Titanium sponge (JIS Class 1, Class 2, and Class 3, granularity=0.25 to 19 mm) produced by the Kroll process and pure titanium scraps (JIS Class 1, Class 2, and Class 3) were used as the titanium lump to be supplied into titanium materials. Further, using Ti-0.06Pd alloy sheet products (thickness was 0.5 to 20 mm), rectangular parallelepipeds having a thickness of 50 to 100 mm, a width of 100 mm, and a length of 120 mm were fabricated as the packages.

When manufacturing the titanium material, first, five titanium sheets were preassembled into a box shape, and thereafter, a titanium sponge was supplied into the box shape, and an opening portion of the preassembled box is covered with a titanium sheet. For some titanium materials, titanium sponges (sponge briquettes) formed into a briquette shape or briquettes obtained by mixing a titanium sponge and a pure titanium scrap were used instead of the titanium sponges. The preassembled titanium material was put inside a vacuum chamber, and the pressure of the vacuum chamber was reduced to a predetermined pressure (vacuum), and thereafter seams of the entire circumference of the package were welded and sealed by an electron beam. The degree of vacuum inside the chamber at that time was made $8.7 \times 10^{-3}$ to $7.6 \times 10^{-2}$ Pa, as shown in Table 2.

In each of some titanium materials (Test Nos. 16 and 17 in Table 2), one sheet of package 1 with a hole opened in the center of the sheet and a titanium pipe having an inner diameter of 6 mm TIG-welded to the hole was prepared, and the titanium material was temporarily assembled such that the one sheet of package is made a rear end face when subjected to rolling.

Thereafter, the entire circumference of the temporarily assembled titanium material was welded by an electron beam, and thereafter, the pressure inside the titanium material was reduced through the titanium pipe to a predetermined degree of vacuum ($6.9 \times 10^{-1}$ to 1.2 Pa), and after the pressure reduction, the degree of vacuum inside the titanium material was kept by clamping the titanium pipe.

By the processes described above, a package the entire circumference of which is sealed with titanium-alloy made sheets was formed, the inner portion of the package was packed with titanium lumps, and the pressure of the inner portion of the package was reduced to the predetermined degree of vacuum.

The fabricated titanium material was heated in an air atmosphere to 850° C. and thereafter subjected to hot rolling to be formed into a hot-rolled sheet having a thickness of 5 mm. Thereafter, both surfaces of the titanium material were subjected to descaling treatment by performing shotblast and using nitric-hydrofluoric acid. In addition, the titanium material was subjected to cold rolling to be formed into a titanium sheet having a thickness of 1 mm, subjected to heat treatment in which the titanium material was heated to 600 to 750° C. and retained for 240 minutes in vacuum or in an inert gas atmosphere, as annealing treatment, and thereby a specimen according to the present invention was fabricated.

From this hot-rolled sheet, a test specimen of 1 mm×30 mm×40 mm (thickness×width×length) was cut out, a cut surface of the test specimen and a surface of the test specimen to which no corrosion resistant titanium alloy sheet was stuck were covered with anti-corrosion tapes such that the cut surface and the surface would not be exposed to a corrosive environment, thereafter, the test specimen was immersed in 3% boiling hydrochloric acid (pH≈0 at normal temperature) for 96 hours, and thereafter, a corrosion rate was calculated from a change in weight before and after a corrosion test.

Further, the produced titanium composite material was embedded in a resin so as to be subjected to cross section observation, the produced titanium composite material was polished and etched and thereafter observed under an optical microscope, and the thickness of a surface layer portion titanium alloy layer was measured. This measured thickness of the surface layer portion titanium alloy layer was divided by the overall thickness of the titanium composite material to be calculated as a surface layer portion ratio.

In order to calculate a proportion of pores remaining in a pure titanium portion of the titanium composite material (hereinafter referred to as porosity), a sample was embedded in a resin such that the cross section of the sample can be observed, thereafter polished and subjected to mirror finish, and thereafter, optical micrographs were taken at 500× magnification. The area proportion of pores were calculated from the taken optical micrographs, the measurement results of five micrographs were averaged and calculated as the porosity. The surface texture of the produced titanium composite material was evaluated in terms of whether a flaw is present or absent in observation with visual check.

For comparison with the titanium composite material according to the present invention, commercially pure titaniums (JIS Classes 1 to 3) and a 1 mm sheet product of a commercially corrosion resistant titanium alloy (Ti-0.06% Pd, ASTM Gr.17) were used to perform the corrosion test described in the foregoing.

The results of the above are collectively shown in Table 2.

TABLE 2

| Test No. | Titanium material for hot working | | | | | Titanium composite material | | | Corrosion rate (mm/y) | Remarks | |
|---|---|---|---|---|---|---|---|---|---|---|---|
| | Material used as inner portion of package | | Interior pure titanium | Package thickness (mm) | Titanium material thickness (mm) | Titanium material degree of vacuum (Pa) | Outer layer thickness (µm) | Surface layer portion ratio (%) | Porosity (%) | 3% boiling hydrochloric acid | | |
| | Kind | Dimensions | | | | | | | | | | |
| 1 | — | | — | — | — | — | —* | —* | 0 | 4.12 | Commercially material (JIS Class 1) | Comparative Example |
| 2 | — | | — | — | — | — | —* | —* | 0 | 4.26 | Commercially material (JIS Class 2) | |
| 3 | — | | — | — | — | — | —* | —* | 0 | 4.31 | Commercially material (JIS Class 3) | |
| 4 | — | | — | — | — | — | —* | 100 * | 0 | 0.37 | Commercially material (Ti—0.06Pd, ASTM Gr17) | |
| 5 | Titanium sponge | 1.0~19 mm | JIS Class 1 | 20 | 50 | $8.9 \times 10^{-3}$ | 405 | 40.5 * | 0.1 | 0.36 | Ti—0.06Pd (ASTM Gr17) was used as package | |
| 6 | Titanium sponge | 1.0~19 mm | JIS Class 1 | 20 | 60 | $8.9 \times 10^{-3}$ | 325 | 32.5 | 0.2 | 0.37 | Ti—0.06Pd (ASTM Gr17) was used as package | Inventive Example |
| 7 | Titanium sponge | 1.0~19 mm | JIS Class 1 | 10.2 | 75 | $8.7 \times 10^{-3}$ | 128 | 12.8 | 0.2 | 0.36 | Ti—0.06Pd (ASTM Gr17) was used as package | |
| 8 | Titanium sponge | 1.0~19 mm | JIS Class 2 | 10.2 | 75 | $8.7 \times 10^{-3}$ | 135 | 13.5 | 0.2 | 0.37 | Ti—0.06Pd (ASTM Gr17) was used as package | |
| 9 | Titanium sponge | 1.0~19 mm | JIS Class 3 | 10.2 | 75 | $8.7 \times 10^{-3}$ | 142 | 14.2 | 0.2 | 0.37 | Ti—0.06Pd (ASTM Gr17) was used as package | |

TABLE 2-continued

| Test No. | Titanium material for hot working | | | | | | Titanium composite material | | | Corrosion rate (mm/y) 3% boiling hydrochloric acid | Remarks | |
|---|---|---|---|---|---|---|---|---|---|---|---|---|
| | Material used as inner portion of package | | Interior pure titanium | Package thickness (mm) | Titanium material thickness (mm) | Titanium material degree of vacuum (Pa) | Outer layer thickness (μm) | Surface layer portion ratio (%) | Porosity (%) | | | |
| | Kind | Dimensions | | | | | | | | | | |
| 10 | Titanium sponge | 1.0~19 mm | JIS Class 1 | 8.0 | 75 | $1.2 \times 10^{-2}$ | 99 | 9.9 | 0.2 | 0.35 | Ti—0.06Pd (ASTM Gr17) was used as package | |
| 11 | Titanium sponge | 1.0~19 mm | JIS Class 1 | 2.5 | 75 | $8.7 \times 10^{-3}$ | 25 | 2.5 | 0.2 | 0.37 | Ti—0.06Pd (ASTM Gr17) was used as package | |
| 12 | Titanium sponge | 1.0~19 mm | JIS Class 1 | 1.5 | 75 | $7.6 \times 10^{-2}$ | 12 | 1.2 | 0.3 | 0.36 | Ti—0.06Pd (ASTM Gr17) was used as package | |
| 13 | Titanium sponge | 1.0~19 mm | JIS Class 1 | 1.1 | 75 | $8.7 \times 10^{-3}$ | 6.7 | 0.7 | 0.3 | 0.37 | Ti—0.06Pd (ASTM Gr17) was used as package | |
| 14 | Titanium sponge | 1.0~19 mm | JIS Class 1 | 1.1 | 100 | $8.7 \times 10^{-3}$ | 3.0 | 0.3 | 0.2 | 0.37 | Ti—0.06Pd (ASTM Gr17) was used as package | |
| 15 | Titanium sponge | 1.0~19 mm | JIS Class 1 | 1.1 | 100 | $8.9 \times 10^{-3}$ | 0.9 * | 0.1 | 0.2 | 2.58 | Ti—0.06Pd (ASTM Gr17) was used as package | Comp. Ex. |
| 16 | Titanium sponge | 1.0~19 mm | JIS Class 1 | 10.2 | 75 | $6.9 \times 10^{-1}$ | 128 | 12.8 | 0.5 | 0.36 | Ti—0.06Pd (ASTM Gr17) was used as package | Inventive Example |
| 17 | Titanium sponge | 1.0~19 mm | JIS Class 1 | 10.2 | 75 | 1.2 | 128 | 12.8 | 0.6 | 0.36 | Ti—0.06Pd (ASTM Gr17) was used as package | |
| 18 | Sponge briquette | 1.0~19 mm | JIS Class 1 | 10.2 | 75 | $8.7 \times 10^{-3}$ | 125 | 12.5 | 0.2 | 0.35 | Ti—0.06Pd (ASTM Gr17) was used as package Sponge briquette was used in inner portion of package | |
| 19 | Scrap—including sponge briquette | 1.0~19 mm | JIS Class 1 | 10.2 | 75 | $8.7 \times 10^{-3}$ | 129 | 12.9 | 0.2 | 0.37 | Ti—0.06Pd (ASTM Gr17) was used as package Sponge briquette containing pure titanium scrap was used in inner portion of package | |

The mark "*" indicates that the value fell out of the definition according to the present invention.

Test Nos. 1 to 4 being Comparative Examples were the commercially pure titanium materials (JIS Classes 1 to 3) and the commercially corrosion resistant titanium material (Ti-0.06Pd, ASTM Gr.17) produced by way of melting, decomposing, and forging processes, respectively, and these results serve as benchmarks to evaluate the performance of the titanium composite material of the present invention described later.

Test Nos. 5 to 14 and 16 to 19 being Inventive Example of the present invention all exhibited corrosion resistances that were superior to those of the commercially pure titanium materials produced by way of melting, decomposing, and forging process shown as test Nos. 1 to 3 in Table 2 described in the foregoing, and had corrosion resistances that were equivalent to that of the commercially corrosion resistant titanium material produced by way of melting, decomposing, and forging processes shown as test No. 4.

However, although not having a problem with respect to corrosion rate, test No. 5 had a large surface layer portion contain, the proportion that the titanium alloy portion accounts for was relatively large, and the material cost increased.

Test No. 15 had a corrosion resistance better than that of the pure titanium because the thickness of the surface layer portion was small, but the result of corrosion resistance was inferior to that of the corrosion resistant titanium alloy.

Test Nos. 18 and 19 were titanium composite materials produced using a sponge briquette or a pure-titanium-scrap-containing sponge briquette in which a pure titanium scrap is utilized in a portion of the titanium sponge, as the pure titanium in the inner portion of the titanium material. Test Nos. 18 and 19 had excellent corrosion resistances equivalent to the corrosion resistance of the corrosion resistant titanium alloy similarly to a case where a titanium sponge was used as the inner portion.

Example 1-2

Titanium sponge (JIS Class 1, granularity=0.25 mm or more and 19 mm or less) produced by the Kroll process was used as the titanium lumps to be supplied into titanium materials. Further, using a titanium alloy containing predetermined components (thickness was 10 mm), rectangular parallelepipeds having a thickness of 75 mm, a width of 100 mm, and a length of 120 mm were fabricated as the package.

When manufacturing the titanium material, first, five titanium sheets were preassembled into a box shape, and thereafter, a titanium sponge was supplied into the box shape, and an opening portion of the preassembled box is covered with a titanium sheet. The preassembled titanium material was put inside a vacuum chamber, and the pressure of the vacuum chamber was reduced to $8.7\times10^{-3}$ Pa, and thereafter seams of the entire circumference of the package were welded and sealed by an electron beam.

By the processes described above, a package the entire circumference of which is sealed with titanium-alloy made sheet products was formed, the inner portion of the package was packed with a titanium sponge, and the pressure of the inner portion of the package was reduced to the predetermined degree of vacuum.

The fabricated titanium material was heated in an air atmosphere to 850° C. and thereafter subjected to hot rolling to be formed into a hot-rolled sheet having a thickness of 5 mm. From this specimen, a test specimen of 5 mm×30 mm×40 mm (thickness×width×length) was cut out, and thereafter, the evaluation similar to Example 1-1 was performed.

For comparison with the titanium composite material according to the present invention, a 5 mm sheet product of a commercially pure titanium (JIS Class 1) and a 5 mm sheet product of a commercially corrosion resistant titanium alloy (Ti-0.06% Pd, ASTM Gr.17) were used to perform the corrosion test described in the foregoing.

These results are collectively shown in Table 3.

TABLE 3

| | Titanium material for hot working | | | | | | | |
|---|---|---|---|---|---|---|---|---|
| | Material used as inner portion of package | | Titanium | | Chemical composition of package (by mass %, balance: Ti and impurities) | | | |
| Test No. | Kind | Dimensions | Interior pure titanium | Package thickness (mm) | material thickness (mm) | Platinum group element | Rare earth elements | Co | Ni |
| 20 | — | — | — | — | — | — | — | — | — |
| 21 | — | — | — | — | — | Pd: 0.06 | — | <0.01 | — |
| 22 | — | — | — | — | — | Pd: 0.06 | — | 0.31 | — |
| 23 | — | — | — | — | — | Pd: 0.14 | — | — | — |
| 24 | Titanium sponge | 1.0~19 mm | JIS Class 1 | 10.2 | 75 | Pd: 0.25 | — | — | — |
| 25 | Titanium sponge | 1.0~19 mm | JIS Class 1 | 10.2 | 75 | Pd: 0.14 | — | — | — |
| 26 | Titanium sponge | 1.0~19 mm | JIS Class 1 | 10.2 | 75 | Pd: 0.06 | — | — | — |
| 27 | Titanium sponge | 1.0~19 mm | JIS Class 1 | 10.2 | 75 | Pd: 0.02 | — | — | — |
| 28 | Titanium sponge | 1.0~19 mm | JIS Class 1 | 10.2 | 75 | Pd: 0.01, Ru: 0.03 | — | — | — |
| 29 | Titanium sponge | 1.0~19 mm | JIS Class 1 | 10.2 | 75 | Pd: 0.06 | — | 0.30 | — |
| 30 | Titanium sponge | 1.0~19 mm | JIS Class 1 | 10.2 | 75 | Pd: 0.02 | — | 0.80 | — |
| 31 | Titanium sponge | 1.0~19 mm | JIS Class 1 | 10.2 | 75 | Pd: 0.02 | Y: 0.25 | — | — |
| 32 | Titanium sponge | 1.0~19 mm | JIS Class 1 | 10.2 | 75 | Pd: 0.02 | Y: 0.19 | — | — |
| 33 | Titanium sponge | 1.0~19 mm | JIS Class 1 | 10.2 | 75 | Pd: 0.01 | Y: 0.02 | — | — |
| 34 | Titanium sponge | 1.0~19 mm | JIS Class 1 | 10.2 | 75 | Pd: 0.02 | Y: 0.003 | — | — |
| 35 | Titanium sponge | 1.0~19 mm | JIS Class 1 | 10.2 | 75 | Pd: 0.03 | Dy: 0.10 | — | — |
| 36 | Titanium sponge | 1.0~19 mm | JIS Class 1 | 10.2 | 75 | Pd: 0.03 | La: 0.08 | — | — |
| 37 | Titanium sponge | 1.0~19 mm | JIS Class 1 | 10.2 | 75 | Pd: 0.03 | Didymium: 0.04 | — | — |
| 38 | Titanium sponge | 1.0~19 mm | JIS Class 1 | 10.2 | 75 | Pd: 0.03 | Pr: 0.04 | — | — |
| 39 | Titanium sponge | 1.0~19 mm | JIS Class 1 | 10.2 | 75 | Pd: 0.02 | Ce: 0.09 | — | — |

TABLE 3-continued

| | | | | | | | | | |
|---|---|---|---|---|---|---|---|---|---|
| 40 | Titanium sponge | 1.0~19 mm | JIS Class 1 | 10.2 | 75 | Pd: 0.02 | Mm: 0.05 | — | — |
| 41 | Titanium sponge | 1.0~19 mm | JIS Class 1 | 10.2 | 75 | Ru: 0.04 | Y: 0.02 | — | — |
| 42 | Titanium sponge | 1.0~19 mm | JIS Class 1 | 10.2 | 75 | Pd: 0.02 | Nd: 0.05 | 0.21 | — |
| 43 | Titanium sponge | 1.0~19 mm | JIS Class 1 | 10.2 | 75 | Pd: 0.01 | Sm: 0.06 | 0.30 | — |
| 44 | Titanium sponge | 1.0~19 mm | JIS Class 1 | 10.2 | 75 | Ru: 0.05 | — | — | 0.50 |
| 45 | Titanium sponge | 1.0~19 mm | JIS Class 1 | 10.2 | 75 | Ru: 0.05 | — | — | 0.20 |
| 46 | Titanium sponge | 1.0~19 mm | JIS Class 1 | 10.2 | 75 | Ru: 0.04 | Y: 0.02 | — | 0.30 |
| 47 | Titanium sponge | 1.0~19 mm | JIS Class 1 | 10.2 | 75 | Pd: 0.02 | — | 0.30 | 0.19 |
| 48 | Titanium sponge | 1.0~19 mm | JIS Class 1 | 10.2 | 75 | Pd: 0.02 | Y: 0.02 | 0.20 | 0.20 |

| Test No. | Titanium composite material | | | Corrosion rate (mm/y) 3% boiling hydrochloric acid | Remarks | |
|---|---|---|---|---|---|---|
| | Outer layer thickness (μm) | Surface layer portion ratio (%) | Porosity (%) | | | |
| 20 | —* | —* | 0* | 4.15 | Commercially material (JIS Class I) | Comparative Example |
| 21 | —* | 100* | 0* | 0.36 | Commercially material (ASTM Gr17) | |
| 22 | —* | 100* | 0* | 0.22 | Commercially material (ASTM Gr19) | |
| 23 | —* | 100* | 0* | 0.04 | Commercially material (ASTM Gr7) | |
| 24 | 680 | 13.8 | 0.1 | 0.03 | | Inventive Example |
| 25 | 650 | 13.2 | 0.1 | 0.05 | | |
| 26 | 600 | 12.2 | 0.1 | 0.38 | | |
| 27 | 590 | 12.0 | 0.1 | 0.70 | | |
| 28 | 630 | 12.8 | 0.1 | 0.40 | | |
| 29 | 650 | 13.2 | 0.1 | 0.22 | | |
| 30 | 690 | 14.0 | 0.1 | 0.16 | | |
| 31 | 750 | 15.2 | 0.2 | 0.42 | | |
| 32 | 750 | 15.2 | 0.1 | 0.38 | | |
| 33 | 610 | 12.4 | 0.1 | 0.29 | | |
| 34 | 600 | 12.2 | 0.1 | 0.30 | | |
| 35 | 610 | 12.4 | 0.1 | 0.23 | | |
| 36 | 615 | 12.5 | 0.1 | 0.25 | | |
| 37 | 610 | 12.4 | 0.1 | 0.24 | | |
| 38 | 600 | 12.2 | 0.1 | 0.23 | | |
| 39 | 620 | 12.6 | 0.1 | 0.24 | | |
| 40 | 615 | 12.5 | 0.1 | 0.25 | | |
| 41 | 620 | 12.6 | 0.1 | 0.29 | | |
| 42 | 660 | 13.4 | 0.1 | 0.20 | | |
| 43 | 655 | 13.3 | 0.1 | 0.22 | | |
| 44 | 590 | 12.0 | 0.1 | 0.32 | | |
| 45 | 595 | 12.1 | 0.1 | 0.43 | | |
| 46 | 610 | 12.4 | 0.1 | 0.31 | | |
| 47 | 630 | 12.8 | 0.2 | 0.25 | | |
| 48 | 700 | 14.2 | 0.2 | 0.19 | | |

The mark "*" indicates that the value fell out of the definition according to the present invention.

Test Nos. 20 to 23 being Comparative Examples, commercially pure titanium materials (JIS Class 1) produced by way of melting, decomposing, and forging processes were commercially corrosion resistant titanium materials produced by way of melting, decomposing, and forging processes, and these results serve as benchmarks to evaluate the performance of the titanium composite material according to the present invention described later.

Test Nos. 24 to 48 being Inventive Example of the present invention all exhibited corrosion resistances that were as excellent as those of commercially corrosion resistant titanium materials produced by way of melting, decomposing, and forging processes shown as test Nos. 21 to 23, and had corrosion resistances that were superior to that of a commercially pure titanium material produced by way of melting, decomposing, and forging processes shown as test No. 20.

Test Nos. 24 to 27 were imparted excellent corrosion resistances by containing Pd being a platinum group element in the surface layer portion titanium alloy.

Test No. 28 was imparted an excellent corrosion resistance by containing Pd and Ru being platinum group elements in the surface layer portion titanium alloy.

Test Nos. 29 and 30 were imparted excellent corrosion resistances by containing Pd being a platinum group element, as well as Co, in the surface layer portion titanium alloy.

Test Nos. 31 to 41 were imparted excellent corrosion resistances by containing Pd or Ru being a platinum group element, as well as Y, Dy, La, didymium, Pr, Ce, or Mm being rare earth elements, in the surface layer portion titanium alloy.

Test Nos. 42 and 43 were imparted excellent corrosion resistances by containing Pd being a platinum group element, as well as Nd and Sm being rare earth elements, and further Co, in the surface layer portion titanium alloy.

Test Nos. 44 and 45 were imparted excellent corrosion resistances by containing Ru being a platinum group element, as well as Ni, in the surface layer portion titanium alloy.

Test No. 46 was imparted an excellent corrosion resistance by containing Pd being a platinum group element, as well as Y being a rare earth element, and further Ni, in the surface layer portion titanium alloy.

Test No. 47 was imparted an excellent corrosion resistance by adding Pd being a platinum group element, as well as Co and Ni in the surface layer portion titanium alloy.

In addition, test No. 48 was imparted an excellent corrosion resistance by adding Pd being a platinum group element, as well as Y being a rare earth element, and further Co and Ni, in the surface layer portion titanium alloy.

Example 1-3

Titanium sponge (JIS Class 1, granularity=0.25 mm or more and 19 mm or less) produced by the Kroll process was used as the titanium lumps to be supplied into titanium materials. Further, using Ti-0.06Pd alloy sheet products, rectangular parallelepipeds having a thickness of 25 to 75 mm, a width of 100 mm, and a length of 120 mm were manufactured as the packages.

When manufacturing the titanium material, first, five titanium sheets were preassembled into a box shape, and thereafter, a titanium sponge was supplied into the box shape, and an opening portion of the preassembled box is covered with a titanium sheet. The preassembled titanium material was put inside a vacuum chamber, and the pressure of the vacuum chamber was reduced to $8.7 \times 10^{-3}$ Pa, and thereafter seams of the entire circumference of the package were welded and sealed by an electron beam.

By the processes described above, a package the entire circumference of which is sealed with titanium-alloy made sheets was formed, the inner portion of the package was packed with a titanium sponge, and the pressure of the inner portion of the package was reduced to the predetermined degree of vacuum.

The manufactured titanium material was heated in an air atmosphere to 850° C. and thereafter subjected to hot rolling to be formed into a hot-rolled sheet having a thickness of 20 mm. The obtained hot-rolled sheet was subjected to vacuum annealing at 725° C., thereafter subjected to shotblast working, and finished by pickling using nitric-hydrofluoric acid to be formed into a titanium composite material. From this specimen, a test specimen of 20 mm×50 mm×50 mm (thickness×width×length) was cut out, and thereafter, the evaluation similar to Examples 1-1 and 1-2 was performed.

These results are collectively shown in Table 4.

TABLE 4

| Test No. | Titanium material for hot working | | | | | Titanium composite material | | | Corrosion rate (mm/y) 3% boiling hydrochloric acid | Remarks | |
|---|---|---|---|---|---|---|---|---|---|---|---|
| | Material used as inner portion of package | | Interior pure titanium | Package thickness (mm) | Titanium material thickness (mm) | Outer layer thickness (µm) | Surface layer portion ratio (%) | Porosity (%) | | | |
| | Kind | Dimensions | | | | | | | | | |
| 49 | — | — | — | — | — | —* | —* | 0* | 4.15 | Commercially material (JIS Class 1) | Comparative Example |
| 50 | — | — | — | — | — | —* | 100* | 0* | 0.36 | Commercially material (ASTM Gr17, Ti—0.06Pd) | |
| 51 | Titanium sponge | 1.0~19 mm | JIS Class 1 | 1.1 | 25 | 970 | 4.9 | 22.5 | 0.38 | Ti—0.06Pd (ASTM Gr17) was used as package | Inventive Example |
| 52 | Titanium sponge | 1.0~19 mm | JIS Class 1 | 1.1 | 30 | 800 | 4.0 | 9.9 | 0.36 | Ti—0.06Pd (ASTM Gr17) was used as package | |
| 53 | Titanium sponge | 1.0~19 mm | JIS Class 1 | 1.1 | 35 | 790 | 4.0 | 2.1 | 0.37 | Ti—0.06Pd (ASTM Gr17) was used as package | |
| 54 | Titanium sponge | 1.0~19 mm | JIS Class 1 | 1.1 | 50 | 520 | 2.6 | 0.9 | 0.36 | Ti—0.06Pd (ASTM Gr17) was used as package | |

TABLE 4-continued

| Test No. | Titanium material for hot working | | | | Titanium composite material | | | Corrosion rate (mm/y) 3% boiling hydrochloric acid | Remarks |
| | Material used as inner portion of package | | Interior pure titanium | Package thickness (mm) | Titanium material thickness (mm) | Outer layer thickness (μm) | Surface layer portion ratio (%) | Porosity (%) | | |
| | Kind | Dimensions | | | | | | | | |
|---|---|---|---|---|---|---|---|---|---|---|
| 55 | Titanium sponge | 1.0~19 mm | JIS Class 1 | 1.1 | 75 | 300 | 1.5 | 0.5 | 0.36 | Ti—0.06Pd (ASTM Gr17) was used as package |

The mark "*" indicates that the value fell out of the definition according to the present invention.

Test Nos. 51 to 55 being Inventive Example of the present invention all exhibited corrosion resistances that were superior to that of the commercially pure titanium material produced by way of melting, decomposing, and forging process shown as test No. 49, and had corrosion resistances that were equivalent to that of the commercially corrosion resistant titanium material produced by way of melting, decomposing, and forging processes shown as test No. 50.

Example 2

Example 2-1

In each of test Nos. 1 to 18 shown in Table 5, the square package 6 having 250 mm×1000 mm×4500 mm (thickness× width×length) and consisting of titanium alloy sheets containing at least one type of Si, Nb, Ta, and Al was manufactured, and thereafter the titanium lumps 7 consisting of the commercially pure titanium (one or more types of material selected from briquette, scrap, and titanium sponge) were supplied in the inner portion of the package 6, the package 6 was enclosed under a vacuum atmosphere at about $8\times10^{-2}$ Pa to be formed into the titanium material 5, and the titanium material 5 was used as a material for hot rolling.

Thereafter, this titanium material 5 was heated to 820° C. and subjected to hot rolling to have a thickness of 5 mm, and thereafter, both surfaces of the titanium material 5 were subjected to descaling treatment by performing shotblast and using nitric-hydrofluoric acid.

In addition, the titanium material 5 was subjected to cold rolling to be formed into a titanium composite material 1 having a thickness of 1 mm, and subjected to heat treatment in which the titanium material was heated to 600 to 750° C. and retained for 240 minutes in vacuum or in an inert gas atmosphere, as annealing treatment.

From these test specimens, 20 mm×20 mm test specimens were taken, the surfaces and the end portions of the test specimens were polished with #400 sandpaper, and thereafter, the test specimens were exposed to the atmospheric air at temperatures of 700 and 750° C. for 200 hours for each of the temperatures, a change in weight of each of the test specimens before and after the test was measured, and an oxidation weight gain per unit cross-sectional area was calculated.

TABLE 5

| Test No. | Titanium material for hot working | | | | | | | | Titanium composite material | | | | | Producibility | |
| | Material used as inner portion of package | Interior pure titanium | Package thickness (mm) | Titanium material degree of vacuum (Pa) | Chemical composition of package (mass %) | | | | Outer layer thickness (μm) | Surface layer portion ratio (%) | Porosity (%) | Oxidation weight gain (g/m²) | | | |
| | | | | | Si | Nb | Al | Ta | | | | 700° C. | 750° C. | | |
|---|---|---|---|---|---|---|---|---|---|---|---|---|---|---|---|
| 1 | — | JIS Class 2 | — | $8 \times 10^{-2}$ | — | — | — | — | —* | —* | 0.02 | 45 | 130 | Good | Comp. Ex. |
| 2 | Briquette | JIS Class 1 | 15.0 | $8 \times 10^{-2}$ | 0.31 | — | — | — | 51 | 5.1 | 0.04 | 19 | 54 | Good | Inventive Example |
| 3 | Briquette | JIS Class 2 | 17.5 | $8 \times 10^{-2}$ | 0.45 | — | — | — | 63 | 6.3 | 0.01 | 18 | 55 | Good | |
| 4 | Briquette + titanium sponge | JIS Class 3 | 14.0 | $8 \times 10^{-2}$ | 0.22 | — | — | — | 48 | 4.8 | 0.09 | 19 | 53 | Good | |
| 5 | Briquette + scrap | JIS Class 2 | 12.0 | $8 \times 10^{-2}$ | — | 0.90 | — | — | 39 | 3.9 | 0.04 | 21 | 63 | Good | |
| 6 | Scrap + titanium sponge | JIS Class 2 | 14.0 | $8 \times 10^{-2}$ | — | — | — | 0.55 | 48 | 4.8 | 0.07 | 23 | 68 | Good | |
| 7 | Briquette + titanium sponge | JIS Class 2 | 22.0 | $8 \times 10^{-2}$ | — | — | 1.20 | — | 80 | 8.0 | 0.05 | 25 | 70 | Good | |

TABLE 5-continued

| | Titanium material for hot working | | | | | | | | Titanium composite material | | | | | |
|---|---|---|---|---|---|---|---|---|---|---|---|---|---|---|
| Test No. | Material used as inner portion of package | Interior pure titanium | Package thickness (mm) | Titanium material degree of vacuum (Pa) | Chemical composition of package (mass %) | | | | Outer layer thickness (μm) | Surface layer portion ratio (%) | Porosity (%) | Oxidation weight gain (g/m²) | | Producibility |
| | | | | | Si | Nb | Al | Ta | | | | 700° C. | 750° C. | |
| 8 | Briquette + titanium sponge | JIS Class 2 | 19.5 | 8 × 10⁻² | 0.25 | 0.35 | — | — | 70 | 7.0 | 0.09 | 15 | 43 | Good |
| 9 | Briquette + titanium sponge | JIS Class 2 | 16.0 | 8 × 10⁻² | 0.31 | 0.44 | — | 0.44 | 56 | 5.6 | 0.08 | 14 | 42 | Good |
| 10 | Briquette + titanium sponge | JIS Class 2 | 16.5 | 8 × 10⁻² | 0.35 | — | 0.90 | — | 58 | 5.8 | 0.04 | 18 | 49 | Good |
| 11 | Briquette + titanium sponge | JIS Class 2 | 30.0 | 8 × 10⁻² | 0.35 | 0.35 | — | 0.85 | 105 | 10.5 | 0.03 | 23 | 59 | Good |
| 12 | Briquette + titanium sponge | JIS Class 2 | 18.0 | 8 × 10⁻² | — | 0.80 | 0.29 | — | 65 | 6.5 | 0.01 | 18 | 48 | Good |
| 13 | Briquette + titanium sponge + scrap | JIS Class 2 | 15.5 | 8 × 10⁻² | — | — | 0.81 | 0.35 | 54 | 5.4 | 0.01 | 21 | 51 | Good |
| 14 | Briquette + titanium sponge + scrap | JIS Class 2 | 14.0 | 8 × 10⁻² | 0.23 | 0.45 | — | 1.31 | 48 | 4.8 | 0.10 | 16 | 43 | Good |
| 15 | Briquette + titanium sponge + scrap | JIS Class 2 | 15.0 | 8 × 10⁻² | — | 0.80 | 0.29 | 0.40 | 52 | 5.2 | 0.30 | 17 | 45 | Good |
| 16 | Briquette + titanium sponge + scrap | JIS Class 2 | 15.5 | 8 × 10⁻² | 0.45 | 0.20 | 0.50 | — | 56 | 5.6 | 0.05 | 14 | 40 | Good |
| 17 | Briquette + titanium sponge + scrap | JIS Class 2 | 16.0 | 8 × 10⁻² | 0.20 | — | 0.30 | 0.55 | 57 | 5.7 | 0.08 | 18 | 42 | Good |
| 18 | Briquette | JIS Class 2 | 18.0 | 8 × 10⁻² | 0.20 | 0.30 | 0.30 | 0.35 | 63 | 6.3 | 0.32 | 15 | 41 | Good |

The mark "*" indicates that the value fell out of the definition according to the present invention.

In Test No. 1 being a Comparative Example, the inner layer portion 4 consisted of the commercially pure titanium of JIS Class 2, and the first surface layer portion 2 and the second surface layer portion 3 were not included. Therefore, the oxidation weight gain in the heating at 700° C. for 200 hours was 40 g/m² or more, the oxidation weight gain in the heating at 750° C. for 200 hours was 100 g/m² or more, and these were very large.

In Test No. 2, the inner layer portion 4 consisted of the commercially pure titanium of JIS Class 1, the first surface layer portion 2 and the second surface layer portion 3 contained Si and had a thickness of 5 μm or more, and this thickness was a sufficient thickness. Therefore, the oxidation weight gain in the heating at 700° C. for 200 hours was 25 g/m² or less, the oxidation weight gain in the heating at 750° C. for 200 hours was 70 g/m² or less, and test No. 2 exhibited an excellent oxidation resistance. Further, the porosity was less than 1%, and the mechanical nature was good.

In Test No. 3, the inner layer portion 4 consisted of the commercially pure titanium of JIS Class 2, the first surface layer portion 2 and the second surface layer portion 3 contained Si and had a thickness of 5 μm or more, and this thickness was a sufficient thickness. Therefore, the oxidation weight gain in the heating at 700° C. for 200 hours was 25 g/m² or less, the oxidation weight gain in the heating at 750° C. for 200 hours was 70 g/m² or less, and test No. 2 exhibited an excellent oxidation resistance. Further, the porosity was less than 1%, and the mechanical nature was good.

In Test No. 4, the inner layer portion 4 consisted of the commercially pure titanium of JIS Class 3, the first surface layer portion 2 and the second surface layer portion 3 contained Si and had a thickness of 5 μm or more, and this thickness was a sufficient thickness. Therefore, the oxidation weight gain in the heating at 700° C. for 200 hours was 25 g/m² or less, the oxidation weight gain in the heating at 750° C. for 200 hours was 70 g/m² or less, and test No. 2 exhibited an excellent oxidation resistance. Further, the porosity was less than 1%, and the mechanical nature was good.

In Test Nos. 5 to 18, the inner layer portion 4 consisted of the commercially pure titanium of JIS Class 2, the first surface layer portion 2 and the second surface layer portion 3 contained one or more types of element selected from Si, Nb, Ta, and Al, and had a thickness of 5 μm or more, and this thickness was a sufficient thickness. Therefore, the oxidation weight gain in the heating at 700° C. for 200 hours was 25 g/m² or less, the oxidation weight gain in the heating at 750° C. for 200 hours was 70 g/m² or less, and test No. 2 exhibited an excellent oxidation resistance. Further, the porosity was less than 1%, and the mechanical nature was good.

Example 2-2

In each of test Nos. 19 and 20 shown in Table 6, the package 6 having 50 mm×1000 mm×4000 mm (thickness× width×length) and consisting of titanium alloy sheets containing Nb was manufactured, thereafter the titanium lumps 7 consisting of the commercially pure titanium (briquette and titanium sponge) was supplied in the inner portion of the package 6, the package 6 was enclosed under a vacuum atmosphere at about $8\times10^{-2}$ Pa to be formed into the titanium material 5, and the titanium material 5 was used as a material for hot rolling.

This titanium material 5 was heated to 820° C. and subjected to hot rolling to have a thickness of 20 mm, and thereafter, both surfaces of the titanium material 5 were subjected to descaling treatment by performing shotblast and using nitric-hydrofluoric acid. In addition, the titanium material 5 was subjected to heat treatment in which the titanium material was heated to 600 to 700° C. and retained for 240 minutes in a vacuum or in an inert gas atmosphere, as annealing treatment.

C. for 200 hours was 25 g/m² or less, the oxidation weight gain in the heating at 750° C. for 200 hours was 70 g/m² or less, and test No. 2 exhibited an excellent oxidation resistance.

Example 2-3

As shown in Table 7, for test No. 21, titanium alloy sheets consisting of Ti-1.0Cu-1.0Sn-0.35Si-0.25Nb were used, for No. 22, titanium alloy sheets consisting of Ti-1.0Cu-0.5Nb were used, and for No. 23, titanium alloy sheets consisting of Ti-0.25Fe-0.45Si were used, the package 6 having 250 mm×1000 mm×4500 mm (thickness×width×length) was manufactured, thereafter the titanium lumps 7 consisting of the commercially pure titanium (briquette and titanium sponge) was supplied in the inner portion of the package 6, the package 6 was enclosed under a vacuum atmosphere at about $8\times10^{-2}$ Pa to be formed into the titanium material 5, and the titanium material 5 was used as a material for hot rolling.

Thereafter, this titanium material 5 was heated to 820° C. and subjected to hot rolling to have a thickness of 5 mm, and thereafter, both surfaces of the titanium material 5 were

TABLE 6

| | Titanium material for hot working | | | | | | | | Titanium composite material | | | | | |
|---|---|---|---|---|---|---|---|---|---|---|---|---|---|---|
| Test No. | Material used as inner portion of package | Interior pure titanium | Package thickness (mm) | Titanium material degree of vacuum (Pa) | Chemical composition of package (mass %) | | | | Outer layer thickness (μm) | Surface layer portion ratio (%) | Porosity (%) | Oxidation weight gain (g/m²) | | Produc-ibility |
| | | | | | Si | Nb | Al | Ta | | | | 700° C. | 750° C. | |
| 19 | Briquette + titanium sponge | JIS Class 2 | 18.0 | $8 \times 10^{-2}$ | — | 0.85 | — | — | 7000 | 35.0 | 25 | 18 | 55 | Good | Inventive Example |
| 20 | Briquette + titanium sponge | JIS Class 3 | 18.0 | $8 \times 10^{-2}$ | — | 1.85 | — | — | 7000 | 35.0 | 9.5 | 18 | 55 | Good | |

In Test Nos. 19 and 20, the inner layer portion 4 consisted of the commercially pure titanium of JIS Class 2, and the first surface layer portion 2 and the second surface layer portion 3 consisted of a titanium alloy containing Nb. Further, the porosity of the inner layer portion 4 was less than 30%. In addition, the first surface layer portion 2 and the second surface layer portion 3 had a thickness of 5 μm or more, and this thickness was a sufficient thickness. Therefore, the oxidation weight gain in the heating at 700° subjected to descaling treatment in which about 40 μm was removed per side (80 μm on both surfaces) using shotblast and nitric-hydrofluoric acid.

In addition, the titanium material 5 was subjected to cold rolling to be formed into a titanium composite material 1 having a thickness of 1 mm, and subjected to heat treatment in which the titanium material was heated to 600 to 700° C. and retained for 240 minutes in vacuum or in an inert gas atmosphere, as annealing treatment.

TABLE 7

| | Titanium material for hot working | | | | | | | | | | |
|---|---|---|---|---|---|---|---|---|---|---|---|
| Test No. | Material used as inner portion of package | Interior pure titanium | Package thickness (mm) | Titanium material degree of vacuum (Pa) | Chemical composition of package (mass %) | | | | | | |
| | | | | | Si | Nb | Al | Ta | Cu | Sn | Fe |
| 21 | Briquette + titanium sponge | JIS Class 2 | 14.0 | $8 \times 10^{-2}$ | 0.35 | 0.2 | — | — | 1.00 | 1.00 | — |
| 22 | Briquette + titanium sponge | JIS Class 2 | 16.0 | $8 \times 10^{-2}$ | — | 0.5 | — | — | 1.00 | — | — |
| 23 | Briquette + titanium | JIS Class 2 | 14.0 | $8 \times 10^{-2}$ | 0.45 | — | — | — | — | — | 0.25 |

TABLE 7-continued sponge

| | Titanium composite material | | | | | |
|---|---|---|---|---|---|---|
| | Outer layer thickness (μm) | Surface layer portion ratio (%) | Porosity (%) | Oxidation weight gain (g/m²) | | Producibility |
| | | | | 700° C. | 750° C. | |
| 21 | 48 | 4.8 | 0.09 | 20 | 59 | Good | Inventive Example |
| 22 | 55 | 5.5 | 0.05 | 19 | 60 | Good |
| 23 | 44 | 4.4 | 0.08 | 17 | 55 | Good |

In all of test Nos. 21 to 23, the first surface layer portion 2 and the second surface layer portion 3 contained one or more types of element of Si and Nb. Further, the porosity of the inner layer portion 4 was less than 0.1%, and this was low. In addition, the first surface layer portion 2 and the second surface layer portion 3 had a thickness of 5 μm or more, and this thickness was a sufficient thickness. Therefore, the oxidation weight gain in the heating at 700° C. for 200 hours was 25 g/m² or less, the oxidation weight gain in the heating at 750° C. for 200 hours was 70 g/m² or less, and test No. 2 exhibited an excellent oxidation resistance.

Example 3

Example 3-1

As illustrated in FIGS. 1 and 2, the titanium materials 5 were each made by packing the inner portion of the package 6 made of titanium alloy sheets with the titanium lumps 7, a method for rolling these titanium materials 5 was performed, and thereby test specimens were manufactured.

Note that, the overall thickness of each titanium material 5 was 125 mm, the total content of Fe, Cr, Ni, Al, and Zr of the package 6 was 0.03 to 1.1%, the chemical composition of the titanium lumps 7 in the inner portion fell within ranges of O: 0.030 to 0.33%, and Fe: 0.028 to 0.086%, and was C: 0.01% or less, H: 0.003 or less, and N: 0.006% or less. In order to compare the influence of hot-rolling ratio, some of the titanium materials 5 having overall thicknesses of 25 mm or 50 mm were manufactured.

Specifically, titanium alloy sheets having adjusted concentrations of Fe, Cr, Ni, Al, and Zr and an adjusted thickness were used in an outer circumference to manufacture the package 6, and the inner portion of this package 6 was packed with a compressed body (briquette) made by subjecting a titanium sponge to compression molding, and thereafter, a lid of the titanium material 5 was welded.

Some of the titanium materials 5 were manufactured by packing a titanium sponge as it is without being formed into a briquette, and some of the titanium materials 5 were manufactured by packing a briquette including scraps which are mixed at 10% or 30% and made by cutting a pure-titanium sheet having the same composition as that of a titanium sponge into an about-25 mm square.

As to a welding method, in order to prevent the titanium lumps 7 from being oxidized or nitrided in hot working, electron beam welding was performed in a vacuum atmosphere in which the degree of vacuum of the inner portion of the titanium material 5 is made 10 Pa or less.

Thereafter, the titanium material 5 was subjected to hot rolling to have a thickness of 5 mm, and thereafter subjected to descaling (shotblast and pickling), cold rolling, and annealing to be formed into the titanium composite material 1. Note that the thickness of the first surface layer portion 2 and the second surface layer portion 3 constituting an element concentrating region (titanium alloy) was adjusted depending on the thickness of the outside titanium alloy sheets and a surface removal amount in the descaling.

As to each test material being the titanium composite material 1, α phase grain size, tensile strength, elongation, fatigue strength, and formability at different positions were evaluated under the following conditions.

(Grain Size of α Phase)

The thickness of the first surface layer portion 2 and the second surface layer portion 3 was measured by an EPMA. On microstructure photographs taken under an optical microscope, the average grain size of α phases at positions of sheet thickness of 1 to 10% was calculated in the inner layer portion and the surface layer portion by an intercept method in accordance with JIS G 0551 (2005).

(Tensile Strength, Elongation)

Tensile test materials were prepared in which a parallel portion was 6.25×32 mm, a distance between gauge points was 25 mm, a chuck portion was 10 mm in width and an overall length was 80 mm (size that was half the size of a JIS13-B tensile test material), and a tensile test was carried out under conditions of an elastic stress rate of 0.5%/min between gauge points until a 0.2% proof stress measurement and 30%/min from the proof stress onward. In this case, the tensile strength and total elongation in a direction perpendicular to the rolling direction were evaluated.

(Fatigue Strength)

Figure 3:
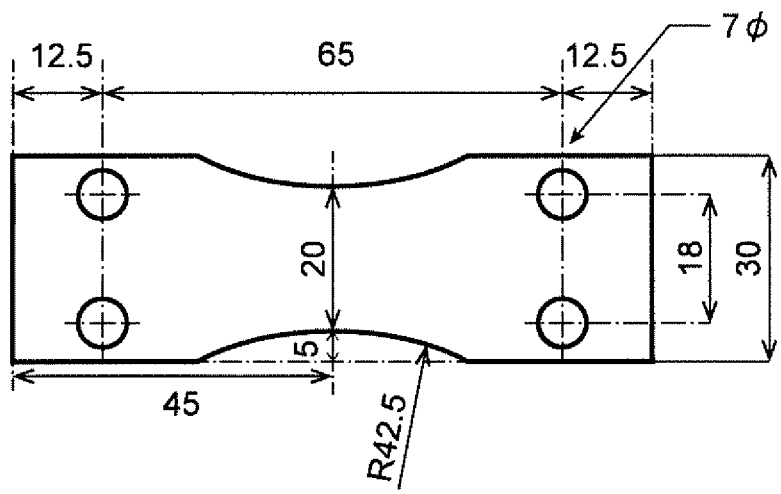
FIG. 3 is an explanatory drawing illustrating a plane bending fatigue test material.

A fatigue test was performed under conditions of a stress ratio R=−1 and a frequency of 25 Hz using the plane bending fatigue test material illustrated in FIG. 3 and a plane bending fatigue testing machine manufactured by Tokyo Koki Co. Ltd. The number of repetitions until rupturing at respective stress amplitudes was determined to prepare a stress fatigue curve, and a fatigue limit (fatigue strength) at which rupturing did not occur even when bending was repeated $10^7$ times was evaluated.

(Formability)

A titanium sheet that was worked into a shape of 90 mm×90 mm×0.5 mm was subjected to a spherical stretch forming test using a spherical punch of φ40 mm using a deep drawing testing machine of model number SAS-350D manufactured by Tokyo Testing Machine Inc. For the punch stretch forming test, a high viscosity oil (#660) manufactured by Nihon Kohsakuyu Co., Ltd. was applied and a polyethylene sheet was placed thereon so that the punch and titanium sheet did not directly contact, and evaluation was performed by comparison with a bulge height at a time when the test material ruptured.

Since a bulging height in a spherical stretch forming test significantly receives the influence of oxygen concentration, if the bulging height was 21.0 mm or more in JIS Class 1, the bulging height was 19.0 mm or more in JIS Class 2, or the bulging height was 13.0 mm or more in JIS Class 3, the formability was determined as good (the mark "O" in the table). If otherwise, the formability was determined as poor (the mark "x" in the table).

(Metal Microstructure)

Figure 4:
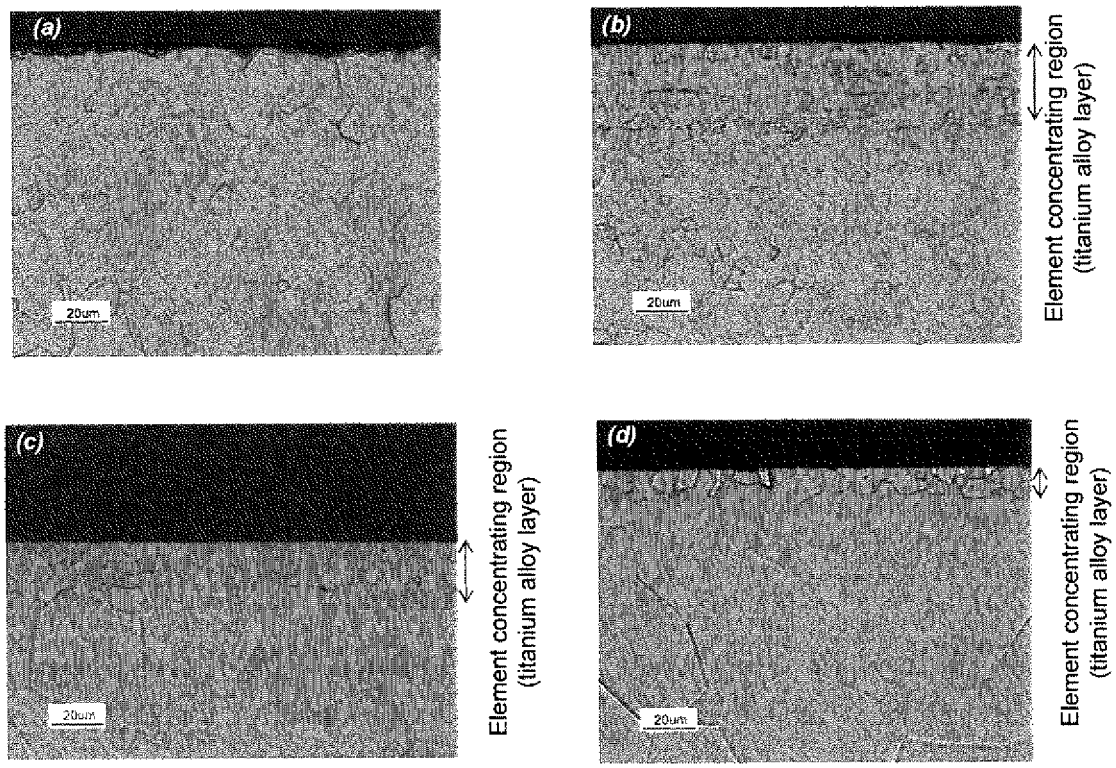
FIG. 4 illustrates an example of microstructure photographs in the case of manufacturing by a method described in the present specification.

FIG. 4 illustrates an example of microstructure photographs in the case of manufacturing by the method described above. FIG. 4(a) is a microstructure photograph of test No. 1 (Comparative Example, a common titanium material), FIG. 4(b) is a microstructure photograph of test No. 5 (Inventive Example of present invention), FIG. 4(c) is a microstructure photograph of test No. 12 (Inventive Example of present invention), and FIG. 4(d) is a microstructure photograph of test No. 17 (Inventive Example of present invention).

Note that FIG. 4(b) to FIG. 4(d) are Inventive Example of the present invention, and the thickness of the first surface layer portion 2 and the second surface layer portion 3 differs.

The test results are collectively shown in Tables 8 and 9. Table 8 shows the case of using a commercially pure titanium equivalent to JIS Class 1 as the titanium lumps 7, and Table 9 shows the case of using commercially pure titaniums equivalent to JIS Classes 2 or 3 as the titanium lumps 7. Further, the signs N1 to N4 in the column of "LEVEL OF MATERIAL FORM USED AS PACKAGE INNER PORTION" in Tables 8 and 9 indicate the following kinds and ratios.

N1: Briquette including 100% of titanium sponge

N2: 100% of titanium sponge as it is

N3: Briquette including mixture of 90% of titanium sponge and 10% of scrap having the composition equivalent to that of titanium sponge N4: Briquette including mixture of 70% of titanium sponge and 30% of scrap having the composition equivalent to that of titanium sponge

TABLE 8

| | Titanium material for hot working | | | | | | | Conditions after hot rolling | | | |
|---|---|---|---|---|---|---|---|---|---|---|---|
| | Level of material form used as package | Interior | Chemical composition of titanium filler (mass %) | | Chemical composition of package (mass %) | | | Hot- rolling | Final sheet thickness after cold | Final annealing condition | |
| Test No. | inner portion | pure titanium | O | Fe | Alloy component Component | Mass % | Oxygen concentration Mass % | ratio (%) | rolling (mm) | Temperature (° C.) | Time (min) |
| 1 | (Melted ingot) | JIS Class 1 | 0.043 | 0.029 | — | — | — | 96 | 1.0 | 580 | 240 |
| 2 | (Melted ingot) | JIS Class 1 | 0.043 | 0.029 | — | — | — | 96 | 1.0 | 660 | 240 |
| 3 | (Melted ingot) | JIS Class 1 | 0.043 | 0.029 | — | — | — | 85 | 1.0 | 780 | 240 |
| 4 | N3 | JIS Class 1 | 0.043 | 0.028 | Fe | 0.110 | 0.042 | 96 | 1.0 | 660 | 240 |
| 5 | N3 | JIS Class 1 | 0.043 | 0.028 | Fe | | 0.042 | 96 | 1.0 | 660 | 240 |
| 6 | N3 | JIS Class 1 | 0.043 | 0.028 | Fe | 0.11 | 0.042 | 96 | 1.0 | 580 | 240 |
| 7 | N3 | JIS Class 1 | 0.043 | 0.028 | Fe | 0.11 | 0.042 | 96 | 1.0 | 630 | 240 |
| 8 | N1 | JIS Class 1 | 0.043 | 0.028 | Fe | 0.11 | 0.042 | 96 | 0.5 | 630 | 240 |
| 9 | N1 | JIS Class 1 | 0.043 | 0.028 | Fe | 0.11 | 0.042 | 96 | 0.5 | 630 | 240 |
| 10 | N1 | JIS Class 1 | 0.043 | 0.028 | Fe | 0.11 | 0.042 | 96 | 1.0 | 660 | 240 |
| 11 | N1 | JIS Class 1 | 0.043 | 0.028 | Fe | 0.11 | 0.042 | 96 | 1.0 | 660 | 240 |
| 12 | N1 | JIS Class 1 | 0.043 | 0.028 | Fe | 0.11 | 0.042 | 96 | 0.5 | 660 | 240 |
| 13 | N1 | JIS Class 1 | 0.043 | 0.028 | Fe | 0.11 | 0.042 | 96 | 0.5 | 660 | 240 |
| 14 | N1 | JIS Class 1 | 0.043 | 0.028 | Fe | 0.11 | 0.042 | 96 | 0.5 | 660 | 240 |
| 15 | N1 | JIS Class 1 | 0.043 | 0.028 | Fe | 0.11 | 0.042 | 96 | 0.5 | 700 | 240 |
| 15 | N1 | JIS Class 1 | 0.043 | 0.028 | Fe | 0.11 | 0.042 | 96 | 0.5 | 720 | 240 |
| 17 | N1 | JIS Class 1 | 0.043 | 0.028 | Fe | 0.11 | 0.042 | 96 | 0.5 | 630 | 240 |
| 18 | N1 | JIS Class 1 | 0.043 | 0.028 | Fe | 0.11 | 0.042 | 96 | 0.5 | 660 | 240 |
| 19 | N1 | JIS Class 1 | 0.043 | 0.028 | Fe | 0.11 | 0.042 | 96 | 0.5 | 630 | 240 |
| 20 | N1 | JIS Class 1 | 0.043 | 0.028 | Fe | 0.11 | 0.042 | 96 | 0.5 | 630 | 240 |
| 21 | N1 | JIS Class 1 | 0.043 | 0.028 | Fe | 0.21 | 0.042 | 96 | 1.0 | 630 | 240 |
| 21 | N1 | JIS Class 1 | 0.043 | 0.028 | Fe | 0.46 | 0.042 | 96 | 1.0 | 630 | 240 |
| 23 | N2 | JIS Class 1 | 0.043 | 0.028 | Fe | 0.11 | 0.042 | 96 | 1.0 | 660 | 240 |
| 24 | N3 | JIS Class 1 | 0.043 | 0.028 | Fe | 0.11 | 0.042 | 96 | 1.0 | 660 | 240 |
| 25 | N4 | JIS Class 1 | 0.043 | 0.028 | Fe | 0.11 | 0.042 | 96 | 1.0 | 660 | 240 |
| 26 | N1 | JIS Class 1 | 0.043 | 0.028 | Al | 0.22 | 0.042 | 96 | 0.5 | 680 | 30 |
| 27 | N1 | JIS Class 1 | 0.043 | 0.028 | Al | 0.22 | 0.042 | 96 | 0.5 | 700 | 30 |
| 28 | N1 | JIS Class 1 | 0.043 | 0.028 | Cr | 0.41 | 0.042 | 96 | 0.5 | 660 | 240 |
| 29 | N1 | JIS Class 1 | 0.043 | 0.028 | Ni | 0.19 | 0.042 | 96 | 0.5 | 660 | 240 |
| 30 | N1 | JIS Class 1 | 0.043 | 0.028 | Zr | 0.20 | 0.040 | 96 | 0.5 | 660 | 240 |
| 31 | N1 | JIS Class 1 | 0.043 | 0.028 | Fe0.03, Cr0.02, Ni0.05/total 0.1 | | 0.040 | 96 | 0.5 | 660 | 240 |
| 32 | N1 | JIS Class 1 | 0.043 | 0.028 | Fe0.05, Cr0.05, Ni0.08/total 0.18 | | 0.040 | 96 | 0.5 | 660 | 240 |

TABLE 8-continued

| | | | | | | | | | | |
|---|---|---|---|---|---|---|---|---|---|---|
| 33 | N1 | JIS Class 1 | 0.043 | 0.028 | Fe0.03, Al0.1, Cr0.02, Zr0.07/total 0.22 | 0.040 | 96 | 0.5 | 660 | 240 |

| | Titanium composite material | | | | | | | | | |
|---|---|---|---|---|---|---|---|---|---|---|
| | Inner portion | | Surface layer portion | | | Mechanical properties | | | | |
| | | | Outer layer | Surface layer postion | Average | | Tensile | Fatigue | Fatigue | Bulging |
| Test No. | Average grain size (μm) | Porosity (%) | thickness (μm) | ratio (%) | grain size (μm) | Elongation (%) | strength (MPa) | strength (MPa) | strength ratio | height (mm) |
|---|---|---|---|---|---|---|---|---|---|---|
| 1 | 14 | 0* | —* | —* | | 45 | 349 | 221 | 0.63 | 20.3 | Comparative
| 2 | 55 | 0* | —* | —* | | 49 | 289 | 182 | 0.63 | 21.9 | Example
| 3 | 300 | 0* | —* | —* | | 56 | 284 | 157 | 0.55 | 19.9 |
| 4 | 35 | 0 | 36 | 4 | 1 | 30 | 306 | 237 | 0.77 | 21.4 | Inventive
| 5 | 49 | 0.1 | 37 | 3.7 | 9 | 36 | 305 | 205 | 0.67 | 21.1 | Example
| 6 | 10 | 0.02 | 39 | 3.9 | 5 | 34 | 341 | 251 | 0.74 | 21.2 |
| 7 | 32 | 0.02 | 22 | 2.2 | 5 | 39 | 308 | 236 | 0.77 | 21.2 |
| 8 | 35 | 0.01 | 19 | 3.8 | 5 | 38 | 310 | 238 | 0.77 | 21.4 |
| 9 | 33 | 0.01 | 37 | 7.4 | 5 | 34 | 321 | 242 | 0.75 | 21.2 |
| 10 | 56 | 0.02 | 16 | 1.6 | 9 | 39 | 300 | 226 | 0.75 | 21.4 |
| 11 | 56 | 0.02 | 38 | 3.8 | 9 | 38 | 306 | 233 | 0.76 | 21.4 |
| 12 | 56 | 0.01 | 38 | 7.5 | 9 | 35 | 309 | 240 | 0.78 | 21.5 |
| 13 | 59 | 0.01 | 19 | 3.8 | 10 | 42 | 300 | 230 | 0.77 | 21.4 |
| 14 | 59 | 0.01 | 38 | 7.5 | 10 | 40 | 306 | 229 | 0.75 | 21.3 |
| 15 | 73 | 0.01 | 19 | 3.8 | 14 | 44 | 297 | 226 | 0.76 | 21.7 |
| 15 | 98 | 0.01 | 34 | 6.8 | 5 | 46 | 296 | 227 | 0.77 | 21.5 |
| 17 | 33 | 0.01 | 5 | 1.0 | 5 | 37 | 296 | 197 | 0.67 | 21.4 |
| 18 | 56 | 0.01 | 8 | 1.5 | 7 | 37 | 295 | 200 | 0.68 | 21.4 |
| 19 | 33 | 0.01 | 48 | 9.6 | 5 | 34 | 330 | 242 | 0.73 | 21.3 |
| 20 | 33 | 0.01 | 80 | 16.6 | 5 | 30 | 338 | 244 | 0.72 | 21.1 |
| 21 | 32 | 0.02 | 50 | 5.0 | 4 | 34 | 325 | 244 | 0.75 | 21.1 |
| 21 | 32 | 0.02 | 51 | 5.1 | 3 | 32 | 326 | 248 | 0.76 | 21.1 |
| 23 | 55 | 0.02 | 37 | 3.7 | 9 | 39 | 305 | 235 | 0.77 | 21.2 |
| 24 | 56 | 0.02 | 38 | 3.8 | 8 | 39 | 303 | 234 | 0.77 | 21.3 |
| 25 | 55 | 0.02 | 37 | 3.7 | 10 | 38 | 304 | 234 | 0.77 | 21.4 |
| 26 | 37 | 0.01 | 20 | 4.0 | 6 | 38 | 306 | 225 | 0.74 | 21.3 |
| 27 | 47 | 0.01 | 20 | 4.0 | 10 | 34 | 311 | 229 | 0.74 | 21.4 |
| 28 | 55 | 0.01 | 21 | 4.1 | 3 | 35 | 315 | 245 | 0.78 | 21.0 |
| 29 | 56 | 0.01 | 21 | 4.1 | 6 | 35 | 314 | 240 | 0.76 | 21.1 |
| 30 | 54 | 0.01 | 21 | 4.1 | 9 | 43 | 300 | 231 | 0.77 | 21.3 |
| 31 | 56 | 0.01 | 20 | 3.9 | 8 | 43 | 302 | 232 | 0.77 | 21.2 |
| 32 | 55 | 0.01 | 20 | 4.0 | 6 | 40 | 306 | 235 | 0.77 | 21.1 |
| 33 | 55 | 0.01 | 21 | 4.2 | 5 | 39 | 309 | 236 | 0.76 | 21.1 |

The mark "*" indicates that the value fell out of the definition according to the present invention.

Test Nos. 4 to 33 in Table 8 were Inventive Example of the present invention that satisfied all of the conditions specified in the present invention, and test Nos. 1 to 3 were Comparative Examples that did not satisfy the conditions specified in the present invention.

Test Nos. 1 to 3 were titanium alloy sheets equivalent to JIS Class 1 and had formabilities and fatigue strengths that serve as standards for evaluating formabilities and fatigue strengths of the Inventive Example of the present invention.

The fatigue strength ratios of test No. 1 to 3 were 0.63, 0.63, and 0.55, respectively, and these were common values.

Test Nos. 4 to 33 acquired mechanical properties of elongation: 30 to 46%, tensile strength: 295 to 341 MPa, fatigue strength: 197 to 251 MPa, fatigue strength ratio: 0.67 to 0.78, and bulging height: 21.0 to 21.7 mm, and it is understood that test Nos. 4 to 33 were excellent in both formability and fatigue strength.

TABLE 9

| | Titanium material for hot working | | | | | | Conditions after hot rolling | | | |
|---|---|---|---|---|---|---|---|---|---|---|
| | Level of material form used as package | Chemical composition of titanium filler | | | Chemical composition of package (mass %) | | | Final sheet thickness after cold rolling (mm) | Final annealing condition | |
| Test No. | Interior inner portion | pure titanium | (mass %) O | Fe | Alloy component Component | Mass % | Oxygen concentration Mass % | Hot-rolling ratio (%) | | Temperature (° C.) | Time (min) |
| 34 | (Melted ingot) | JIS Class 2 | 0.082 | 0.056 | — | — | — | 96 | 1.0 | 660 | 240 |

TABLE 9-continued

| Test No. | | | | | | | | | | |
|---|---|---|---|---|---|---|---|---|---|---|
| 35 | (Melted ingot) | JIS Class 2 | 0.082 | 0.056 | — | — | — | 96 | 1.0 | 700 | 240 |
| 36 | N1 | JIS Class 2 | 0.082 | 0.058 | | 0.10 | 0.090 | 96 | 1.0 | 630 | 240 |
| 37 | N1 | JIS Class 2 | 0.082 | 0.058 | Fe | 0.10 | 0.090 | 96 | 1.0 | 660 | 240 |
| 38 | N1 | JIS Class 2 | 0.082 | 0.058 | Fe | 0.10 | 0.090 | 96 | 1.0 | 700 | 240 |
| 39 | N1 | JIS Class 2 | 0.082 | 0.058 | Fe | 0.10 | 0.090 | 96 | 1.0 | 700 | 240 |
| 40 | N1 | JIS Class 2 | 0.082 | 0.058 | Fe | 0.45 | 0.092 | 96 | 1.0 | 700 | 240 |
| 41 | N1 | JIS Class 2 | 0.082 | 0.058 | Fe | 0.10 | 0.090 | 96 | 1.0 | 700 | 240 |
| 42 | N1 | JIS Class 2 | 0.082 | 0.058 | Al | 0.20 | 0.092 | 96 | 1.0 | 700 | 240 |
| 43 | N1 | JIS Class 2 | 0.082 | 0.058 | Fe0.03, Al0.1, Cr0.03, Zr0.07/total 0.23 | | 0.091 | 96 | 1.0 | 700 | 240 |
| 44 | (Melted ingot) | JIS Class 3 | 0.180 | 0.050 | — | — | — | 96 | 1.0 | 660 | 240 |
| 45 | (Melted ingot) | JIS Class 3 | 0.180 | 0.049 | — | — | — | 96 | 1.0 | 660 | 240 |
| 46 | N1 | JIS Class 3 | 0.180 | 0.048 | Fe | 0.11 | 0.182 | 96 | 1.0 | 660 | 240 |
| 47 | N1 | JIS Class 3 | 0.180 | 0.048 | Fe | 0.11 | 0.182 | 96 | 1.0 | 660 | 240 |
| 48 | N1 | JIS Class 3 | 0.180 | 0.048 | Fe | 0.11 | 0.182 | 96 | 1.0 | 660 | 240 |
| 49 | N1 | JIS Class 3 | 0.180 | 0.048 | Fe | 0.42 | 0.180 | 96 | 1.0 | 660 | 240 |
| 50 | N1 | JIS Class 3 | 0.180 | 0.049 | Fe | 0.25 | 0.279 | 96 | 1.0 | 660 | 240 |
| 51 | N1 | JIS Class 3 | 0.180 | 0.048 | Al | 0.20 | 0.179 | 96 | 1.0 | 660 | 240 |
| 52 | N1 | JIS Class 3 | 0.180 | 0.048 | Fe0.04, Al0.1, Cr0.04, Zr0.07/total 0.24 | | 0.180 | 96 | 1.0 | 660 | 240 |
| 53 | N1 | JIS Class 4 | 0.301 | 0.052 | Fc | 0.24 | 0.309 | 96 | 1.0 | 660 | 240 |

Titanium composite material

| | Inner portion | | Surface layer portion | | | Mechanical properties | | | | |
|---|---|---|---|---|---|---|---|---|---|---|
| Test No. | Average grain size (μm) | Porosity (%) | Outer layer thickness (μm) | Surface layer portion ratio (%) | Average grain size (μm) | Elongation (%) | Tensile strength (MPa) | Fatigue strength (MPa) | Fatigue strength ratio | Bulging height (mm) | |
| 34 | 39 | 0* | —* | —* | — | 31 | 358 | 207 | 0.58 | 19.2 | Comparative |
| 35 | 65 | 0* | —* | —* | — | 33 | 339 | 199 | 0.59 | 20.1 | Example |
| 36 | 20 | 0.02 | 42 | 4.2 | 10 | 26 | 398 | 275 | 0.69 | 19.2 | Inventive |
| 37 | 40 | 0.02 | 40 | 4.0 | 8 | 27 | 371 | 280 | 0.75 | 19.8 | Example |
| 38 | 66 | 0.02 | 12 | 1.2 | 11 | 33 | 341 | 255 | 0.75 | 20.6 | |
| 39 | 66 | 0.02 | 40 | 4.0 | 12 | 31 | 365 | 272 | 0.75 | 20.2 | |
| 40 | 65 | 0.02 | 43 | 4.3 | 6 | 30 | 364 | 280 | 0.77 | 20.1 | |
| 41 | 66 | 0.02 | 80 | 8.0 | 11 | 25 | 378 | 284 | 0.75 | 19.3 | |
| 42 | 66 | 0.02 | 40 | 4.0 | 11 | 26 | 365 | 279 | 0.76 | 20.0 | |
| 43 | 65 | 0.02 | 42 | 4.2 | 9 | 31 | 362 | 275 | 0.76 | 20.3 | |
| 44 | 39 | 0 | —* | —* | — | 29 | 540 | 321 | 0.59 | 13.6 | Comparative |
| 45 | 38 | 0 | —* | —* | — | 26 | 602 | 348 | 0.58 | 13.1 | Example |
| 46 | 41 | 0.02 | 10 | 1.0 | 9 | 27 | 546 | 379 | 0.69 | 13.5 | Inventive |
| 47 | 41 | 0.02 | 39 | 3.9 | 8 | 28 | 552 | 402 | 0.73 | 13.5 | Example |
| 48 | 41 | 0.02 | 79 | 7.9 | 9 | 25 | 563 | 415 | 0.74 | 13.2 | |
| 49 | 41 | 0.02 | 35 | 3.5 | 6 | 26 | 555 | 417 | 0.75 | 13.3 | |
| 50 | 40 | 0.02 | 45 | 4.5 | 5 | 25 | 606 | 421 | 0.69 | 13.1 | |
| 51 | 41 | 0.02 | 48 | 4.8 | 9 | 26 | 556 | 407 | 0.73 | 13.1 | |
| 52 | 41 | 0.02 | 39 | 3.9 | 6 | 26 | 606 | 407 | 0.67 | 13.1 | |
| 53 | 40 | 0.02 | 45 | 4.5 | 6 | 25 | 614 | 400 | 0.65 | 10.0 | |

The mark "*" indicates that the value fell out of the definition according to the present invention.

Test Nos. 36 to 43 and 46 to 53 in Table 9 were Inventive Example of the present invention that satisfied all of the conditions specified in the present invention, and test Nos. 34, 35, 44, and 45 were Comparative Examples that did not satisfy the conditions specified in the present invention.

Test Nos. 34 and 35 were titanium alloy sheets equivalent to JIS Class 2, and test Nos. 44 and 45 were titanium alloy sheets equivalent to JIS Class 3. Test Nos. 34, 35, 44, and 45 all had formabilities and fatigue strengths that serve as standards for evaluating formabilities and fatigue strengths of the Inventive Example of the present invention. The fatigue strength ratios of test Nos. 34 and 35 were 0.58 and 0.59, respectively, and the fatigue strength ratios of test Nos. 44 and 45 were 0.59 and 0.58, respectively. These were all common values.

Test Nos. 36 to 43 and 46 to 53 acquired mechanical properties of elongation: 25 to 33%, tensile strength: 341 to 614 MPa, fatigue strength: 255 to 421 MPa, fatigue strength ratio: 0.65 to 0.77, and bulging height: 10.0 to 20.6 mm, and it is understood that test Nos. 36 to 43 and 46 to 53 were excellent in both formability and fatigue strength.

Example 4

Example 4-1

Titanium sponge (JIS Class 2, granularity=0.25 to 19 mm) produced by the Kroll process was used as the titanium lump supplied into the package. Further, using β-type titanium alloy Ti-15V-3Cr-3Sn-3Al sheet products (thickness was 1 to 15 mm), rectangular parallelepipeds having thicknesses of 45 to 80 mm, a width of 100 mm, and a length of 120 mm were manufactured as the packages.

When manufacturing the package, first, five titanium sheets were preassembled into a box shape, and thereafter, a titanium sponge was supplied into the box shape, and an opening portion of the preassembled box is covered with a titanium sheet. The preassembled titanium material was put inside a vacuum chamber, and the pressure of the vacuum chamber was reduced to a predetermined pressure (vacuum), and thereafter seams of the entire circumference were welded and sealed by an electron beam. The degree of vacuum inside the chamber at that time was made $8.7\times10^{-3}$ to $2.2\times10^{-2}$ Pa, as shown in Table 10.

By the processes described above, the packages the entire circumference of which is sealed with a β-type titanium alloy was formed, the inner portion of the package was packed with a titanium sponge, and the pressure of the inner portion of the titanium material was reduced to the predetermined degree of vacuum.

The manufactured packages were heated to 850° C. in an air atmosphere, and thereafter subjected to hot rolling at working ratios at 92 to 97% as shown in Table 10 to be formed into hot-rolled sheets having thicknesses of 4.8 to 5.0 mm. Next, the packages were subjected to annealing in a vacuum atmosphere at 600 to 650° C., for 4 to 10 hours. In addition, the packages were subjected to shotblast and pickling to remove scale layers.

Further, to enable cross-sectional observation, the produced titanium composite sheets were embedded in resin and subjected to polishing and etching, and thereafter observed with an optical microscope and the thickness of the surface layer portion was measured. This measured thickness of the surface layer portion was divided by the overall thickness of the titanium composite material to be calculated as a surface layer portion ratio.

In order to calculate a proportion of pores remaining in a pure titanium portion of the titanium composite material (hereinafter referred to as porosity), a sample was embedded in a resin such that the cross section of the sample can be observed, thereafter polished and subjected to mirror finish, and thereafter, optical micrographs were taken at 500× magnification. The area proportion of pores were calculated from the taken optical micrographs, the measurement results of five micrographs were averaged and calculated as the porosity.

For comparison with the titanium composite material according to the present invention, a 5 mm sheet product of the commercially pure titanium (JIS Class 2) was used.

Titanium sheets of the titanium composite materials according to the present invention and the Comparative Example were exposed to a 1 vol. % $H_2$+99 vol. % Ar atmosphere, which is a hydrogen absorbing environment, at 500° C. for 5 hours.

After the exposure, impact test specimens of 4.8 to 5 mm×10 mm×55 mm and having a 2 mm V notch were manufactured, with the longitudinal direction thereof being a rolling direction and the sheet thickness penetrating direction thereof being the direction of the notch. Next, hydrogen embrittlement was evaluated using an impact value that is a value obtained by dividing an impact energy absorption of the Charpy impact test by the cross-sectional area of the test specimen. Here, because the impact value of a pure titanium Class 2 product before the exposure to the hydrogen absorbing environment was $2.5\times10^2$ J/cm$^2$, a case where the impact value after the exposure decreases from $2.5\times10^2$ J/cm$^2$ by 20% or more, that is, a case where the impact value after the exposure was less than $2.0\times10^2$ J/cm$^2$ was determined as the occurrence of the hydrogen embrittlement.

The results of the above are collectively shown in Table 10.

TABLE 10

| | Titanium material for hot working | | | Titanium composite material | | | |
|---|---|---|---|---|---|---|---|
| Test No. | Package thickness (mm) | Titanium material thickness (mm) | Titanium material degree of vacuum (Pa) | Hot-rolling ratio (%) | Surface layer portion ratio (%) | Porosity (%) | Impact value (×10$^2$ J/cm$^2$) |
| 1 | — | 60 | — | 92 | —* | 0* | 1.4 | Comp. Ex. |
| 2 | 2 | 60 | $8.7\times10^{-3}$ | 92 | 3.3 | 0.2 | 2.5 | Inventive |
| 3 | 5 | 60 | $9.2\times10^{-3}$ | 92 | 8.3 | 0.2 | 2.3 | Example |
| 4 | 8 | 60 | $2.2\times10^{-2}$ | 92 | 13.3 | 0.1 | 2.1 | |
| 5 | 5 | 80 | $8.9\times10^{-3}$ | 94 | 6.3 | 0.1 | 2.4 | |
| 6 | 10 | 80 | $1.9\times10^{-2}$ | 97 | 12.5 | 0.1 | 2.2 | |

The mark "*" indicates that the value fell out of the definition according to the present invention.

Test No. 1 was an example of a commercially pure titanium Class 2 product produced without using the package. Under the influence of the exposure to the hydrogen environment, the impact value was less than $2.0\times10^2$ J/cm$^2$, and this was low.

In contrast, test Nos. 2 to 6 that satisfied the specifications of the present invention resulted in impact values of $2.0\times10^2$ J/cm$^2$ or more, and these were high.

Example 4-2

Examples in which the alloy kind of the package was changed with respect to Example 4-1 are described. The sheet thickness of titanium sheets using for the package was 3 mm, the overall thickness of the titanium materials was 60 mm, sheet thicknesses after the hot rolling were 4.8 to 5.0 mm, and the remainder of the sample manufacturing was performed by a method similar to that of Example 4-1. Table 11 shows the examples.

TABLE 11

| Test No. | Titanium material for hot working | | | | Titanium composite material | | | |
|---|---|---|---|---|---|---|---|---|
| | Interior pure titanium | Chemical composition of package | Mo equivalent | Titanium material degree of vacuum (Pa) | Surface layer portion ratio (%) | Porosity (%) | Impact value ($\times 10^2$ J/cm$^2$) | |
| 7 | JIS Class 2 | Ti—15Mo—2.7Nb—3Al—0.2Si | 15.8 | $8.7 \times 10^{-3}$ | 5 | 0.2 | 2.3 | Inventive Example |
| 8 | JIS Class 2 | Ti—3Al—8V—6Cr—4Mo—4Zr | 9.3 | $9.2 \times 10^{-3}$ | 5 | 0.3 | 2.4 | |
| 9 | JIS Class 2 | Ti—20V—4Al—1Sn | 13.3 | $8.7 \times 10^{-3}$ | 5 | 0.2 | 2.1 | |

Test Nos. 7 to 9 satisfied the specification of the present invention and therefore resulted in impact values of $2.0 \times 10^2$ J/cm$^2$ or more, and these were high.

Example 4-3

Examples in which the kind of a titanium sponge to be supplied was changed to JIS Class 3, with respect to Example 4-1, are described. The sheet thickness of titanium sheets using for the package was 3 mm, the overall thickness of the titanium materials was 60 mm, sheet thicknesses after the hot rolling were 4.8 to 5.0 mm, and the remainder of the sample manufacturing was performed by a method similar to that of Example 4-1.

Because the impact value of JIS Class 3 used here was $0.5 \times 10^2$ J/cm$^2$, an impact value decreasing from $0.5 \times 10^2$ J/cm$^2$ by 20% or more, that is, an impact value of $0.4 \times 10^2$ J/cm$^2$ or less was determined as embrittlement by hydrogen. Table 12 shows the examples.

TABLE 12

| Test No. | Titanium material for hot working | | | | Titanium composite material | | | |
|---|---|---|---|---|---|---|---|---|
| | Interior pure titanium | Chemical composition of package | Mo equivalent | Titanium material degree of vacuum (Pa) | Surface layer portion ratio (%) | Porosity (%) | Impact value ($\times 10^2$ J/cm$^2$) | |
| 10 | JIS Class 3 | — | — | — | —* | 0* | 0.3 | Comp. Ex. |
| 11 | JIS Class 3 | Ti—15V—3Cr—3Al—3Sn | 10 | $8.7 \times 10^{-3}$ | 4 | 0.2 | 0.5 | Inv. Ex. |

The mark "*" indicates that the value fell out of the definition according to the present invention.

Test No. 10 was an example of a commercially pure titanium Class 3 product produced without using the package. Under the influence of the exposure to the hydrogen environment, the impact value was less than $0.5 \times 10^2$ J/cm$^2$, and this was low.

Test No. 11 satisfied the specification of the present invention and therefore resulted in impact values of $0.5 \times 10^2$ J/cm$^2$, and these were high.

Example 5

Example 5-1

Neutron shielding sheets of test Nos. 1 to 24 shown in Table 13 were produced by the following method.

TABLE 13

| Test No. | Titanium material for hot working | | | | Titanium composite material | | | | | | |
|---|---|---|---|---|---|---|---|---|---|---|---|
| | Material used as inner portion of package | Interior pure titanium | Package thickness (mm) | Titanium material degree of vacuum (Pa) | B content of surface layer portion (mass %) | Surface layer portion ratio (%) | Porosity (%) | Crack evaluation | Occurrence rate of crack in bending test (%) | Neutron shielding effect | |
| 1 | — | JIS Class 1 | 4 | $8 \times 10^{-3}$ | — | —* | 0.5 | No crack | 0 | 1.0 | Comp. Ex. |
| 2 | Briquette | JIS Class 1 | 20 | $8 \times 10^{-3}$ | 0.5 | 5 | 0.7 | No crack | 0 | 12.4 | Inventive Example |
| 3 | Briquette + titanium sponge | JIS Class 1 | 10 | $8 \times 10^{-3}$ | 3.0 | 5 | 0.8 | No crack | 0 | 13.5 | |
| 4 | Briquette + titanium sponge | JIS Class 1 | 10 | $8 \times 10^{-3}$ | 2.2 | 20 | 0.5 | No crack | 0 | 44.3 | |
| 5 | Briquette + scrap | JIS Class 1 | 10 | $8 \times 10^{-3}$ | 1.5 | 40 | 0.4 | No crack | 0 | 73.1 | |
| 6 | Scrap + titanium sponge | JIS Class 1 | 10 | $8 \times 10^{-3}$ | 0.9 | 40 | 9.8 | No crack | 0 | 63.7 | |
| 7 | Briquette + titanium sponge | JIS Class 1 | 10 | $8 \times 10^{-3}$ | 0.4 | 40 | 30.0 | No crack | 0 | 52.1 | |

TABLE 13-continued

| | Titanium material for hot working | | | | Titanium composite material | | | | | |
|---|---|---|---|---|---|---|---|---|---|---|
| Test No. | Material used as inner portion of package | Interior pure titanium | Package thickness (mm) | Titanium material degree of vacuum (Pa) | B content of surface layer portion (mass %) | Surface layer portion ratio (%) | Porosity (%) | Crack evaluation | Occurrence rate of crack in bending test (%) | Neutron shielding effect |
| 8 | Briquette + titanium sponge | JIS Class 1 | 4 | $8 \times 10^{-3}$ | 0.1 | 5 | 0.6 | No crack | 0 | 1.9 |
| 9 | Briquette + titanium sponge | JIS Class 1 | 4 | $8 \times 10^{-3}$ | 1.5 | 15 | 0.5 | No crack | 0 | 11.3 |
| 10 | Briquette + titanium sponge | JIS Class 1 | 4 | $8 \times 10^{-3}$ | 2.3 | 40 | 0.2 | No crack | 0 | 34.2 |
| 11 | Briquette + titanium sponge | JIS Class 2 | 20 | $8 \times 10^{-3}$ | 0.8 | 5 | 0.8 | No crack | 0 | 15.4 |
| 12 | Briquette + titanium sponge | JIS Class 2 | 10 | $8 \times 10^{-3}$ | 1.4 | 5 | 0.9 | No crack | 0 | 8.9 |
| 13 | Briquette + titanium sponge + scrap | JIS Class 2 | 10 | $8 \times 10^{-3}$ | 0.5 | 25 | 0.3 | No crack | 0 | 29.7 |
| 14 | Briquette + titanium sponge + scrap | JIS Class 2 | 10 | $8 \times 10^{-3}$ | 0.1 | 40 | 0.2 | No crack | 0 | 43.7 |
| 15 | Briquette + titanium sponge + scrap | JIS Class 2 | 4 | $8 \times 10^{-3}$ | 1.2 | 5 | 0.7 | No crack | 0 | 3.9 |
| 16 | Briquette + titanium sponge + scrap | JIS Class 2 | 4 | $8 \times 10^{-3}$ | 1.9 | 15 | 0.4 | No crack | 0 | 12.4 |
| 17 | Briquette + titanium sponge + scrap | JIS Class 2 | 4 | $8 \times 10^{-3}$ | 2.6 | 40 | 0.3 | No crack | 0 | 36.4 |
| 18 | Briquette | JIS Class 3 | 20 | $8 \times 10^{-3}$ | 1.2 | 5 | 0.7 | No crack | 0 | 17.6 |
| 19 | Briquette + titanium sponge + scrap | JIS Class 3 | 10 | $8 \times 10^{-3}$ | 2.5 | 5 | 0.9 | No crack | 0 | 12.5 |
| 20 | Briquette + titanium sponge + scrap | JIS Class 3 | 10 | $8 \times 10^{-3}$ | 1.7 | 15 | 0.3 | No crack | 0 | 28.4 |
| 21 | Briquette + titanium sponge + scrap | JIS Class 3 | 10 | $8 \times 10^{-3}$ | 2.0 | 40 | 0.2 | No crack | 0 | 83.1 |
| 22 | Briquette + titanium sponge + scrap | JIS Class 3 | 4 | $8 \times 10^{-3}$ | 1.3 | 5 | 0.7 | No crack | 0 | 4.0 |
| 23 | Briquette + titanium sponge + scrap | JIS Class 3 | 4 | $8 \times 10^{-3}$ | 1.9 | 20 | 0.4 | No crack | 0 | 16.4 |
| 24 | Briquette + titanium sponge + scrap | JIS Class 3 | 4 | $8 \times 10^{-3}$ | 0.8 | 40 | 0.3 | No crack | 0 | 22.1 |

The mark "*" indicates that the value fell out of the definition according to the present invention.

First, Ti—B alloy sheets for the package 6 were manufactured by hot rolling ingots made by adding B in advance using $TiB_2$ or $^{10}B$ concentrated boron ($H_3{}^{10}BO_3$, $^{10}B_2O^{10}B_4C$) and melting. After the hot rolling, the Ti—B alloy sheets were subjected to strip running through a continuous pickling line consisting of nitric-hydrofluoric acid, and oxide scales on the surfaces of the hot-rolled sheets were removed.

These Ti—B alloy sheets were subjected to electron beam welding under a vacuum atmosphere of about $8 \times 10^{-3}$ Pa in such a manner that the alloy sheets were welded at positions corresponding to five faces of the slab, and thereby the hollow package 6 was manufactured.

One or more types of material selected from a titanium sponge, a briquette by compressing a titanium sponge, and titanium scraps cut into 30 mm×30 mm×30 mm or smaller were put in the inner portion of the package 6, and the remaining one face of the slab was similarly subjected to the electron beam welding, and thereby the titanium material 5 having a thickness of 100 mm and including the inner portion being vacuum was manufactured.

Note that, by changing the thickness of the alloy sheets, the ratio of the surface layer portion with respect to the overall thickness of the hot-rolled sheet can be adjusted.

Figure 5:
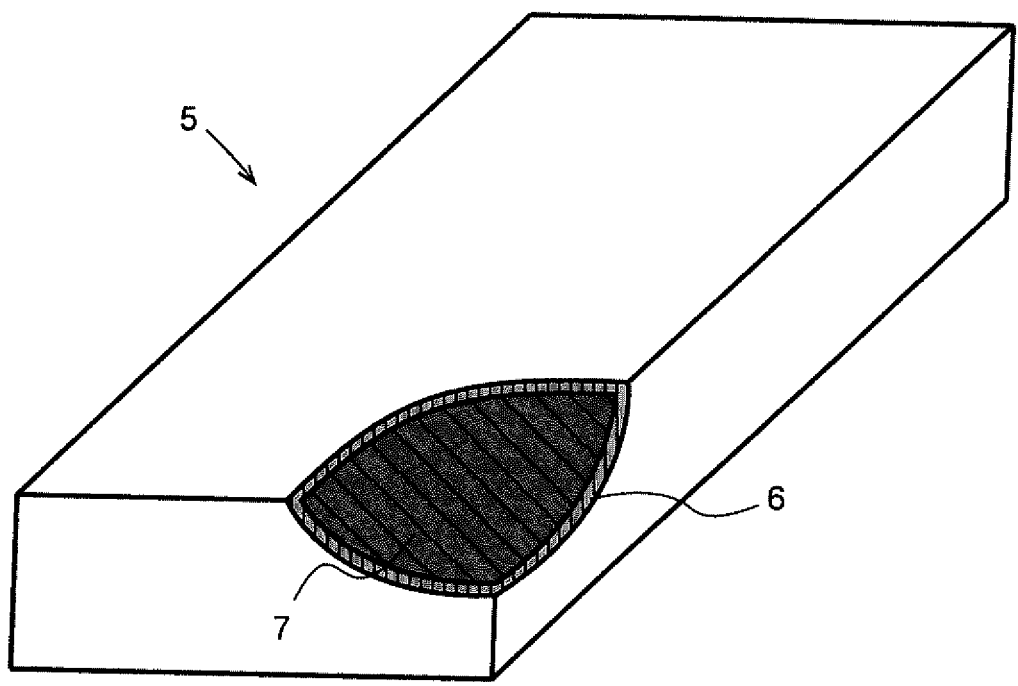
FIG. 5 is a schematic diagram of a titanium material including a titanium sponge and scraps packing within a package that is made slab-like by assembling Ti—B alloy sheets.

FIG. 5 is a schematic diagram of the titanium material 5 including the titanium lump 7 packing within the package 6 that was made slab-like by assembling the Ti—B alloy sheets in this way.

Using steel manufacture facility, this titanium material 5 was heated at 800° C. for 240 minutes and thereafter subjected to hot rolling, and thereby strip coils having thicknesses of about 4 to 20 mm were produced.

The strip coils after the hot rolling were subjected to strip running through a continuous pickling line consisting of nitric-hydrofluoric acid, scarfed by about 50 μm per side, and thereafter subjected to visual observation on an occurrence situation of a crack. Note that, as to a method for measuring the depth of the surface layer portion (B concentrated layer), portions of the hot-rolled sheet after the pickling were cut out (at three spots of a front end, middle and, rear end in the longitudinal direction, extracted from the width-direction-center portions, respectively), polished, and subjected to SEM/EDS analysis, and the proportion of the surface layer portion with respect to the sheet thickness and the B content of the surface layer portion was determined (the average value in an observation spot was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am-Be (4.5 MeV) was used as a radiation source, and a test specimen having dimensions of 500 mm×500 mm×4 to 20 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen (4 mm thickness) and the test specimen (4 to 20 mm thickness), and the neutron shielding effect was evaluated based on the ratio between the measured values (the value for each test specimen is described for a case where the neutron shielding effect of commercially pure titanium of JIS Class 1 is taken as "1").

The results are shown collectively in Table 13.

Comparative Examples and Inventive Example of the present invention of test Nos. 1 to 10 were a case where the kind of a base metal was the commercially pure titanium JIS Class 1.

Test No. 1 being a Comparative Example was a case where a commercially pure titanium not containing B was used as the package 6, rather than Ti—B alloy sheets. There was no crack or the like occurring on the hot-rolled sheet, and no crack occurred in a bending test.

Test No. 2 being Inventive Example of present invention was a case where a titanium material 5 having a thickness of 100 mm was subjected to hot rolling to have a thickness of 20 mm. The ratio of the first surface layer portion 2 and the second surface layer portion 3 was 5%, the B content of the first surface layer portion 2 and the second surface layer portion 3 was 0.5%, therefore there was no crack occurring on the hot-rolled sheet, and no crack occurred in a bending test.

Test Nos. 3 to 7 were a case where a titanium material 5 having a thickness of 100 mm was subjected to hot rolling to have a thickness of 10 mm, and the ratio, B content, and porosity of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheet, and no crack occurred in a bending test.

Test Nos. 8 to 10 were a case where a titanium material 5 having a thickness of 100 mm was subjected to hot rolling to have a thickness of 4 mm, and the ratio and B content of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheets, and no crack occurred in a bending test.

Inventive Example of the present invention shown as test Nos. 11 to 17 were a case where the kind of a base metal was the commercially pure titanium JIS Class 2.

Test No. 11 was a case where a titanium material 5 having a thickness of 100 mm was subjected to hot rolling to have a thickness of 20 mm. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on the hot-rolled sheets, and no crack occurred in a bending test.

Test Nos. 12 to 14 were a case where a titanium material 5 having a thickness of 100 mm was subjected to hot rolling to have a thickness of 10 mm, and the ratio or B content of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheets, and no crack occurred in a bending test.

Test Nos. 15 to 17 were a case where a titanium material 5 having a thickness of 100 mm was subjected to hot rolling to have a thickness of 4 mm, and the ratio or B content of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheets, and no crack occurred in a bending test.

Inventive Example of the present invention of test Nos. 18 to 24 were a case where the kind of a base metal was the commercially pure titanium JIS Class 3.

Test No. 18 was a case where a titanium material 5 having a thickness of 100 mm was subjected to hot rolling to have a thickness of 20 mm. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on the hot-rolled sheets, and no crack occurred in a bending test.

Test Nos. 19 to 21 were a case where a titanium material 5 having a thickness of 100 mm was subjected to hot rolling to have a thickness of 10 mm, and the ratio or B content of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheets, and no crack occurred in a bending test.

Test Nos. 22 to 24 were a case where a titanium material 5 having a thickness of 100 mm was subjected to hot rolling to have a thickness of 4 mm, and the ratio or B content of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the hot-rolled sheets, and no crack occurred in a bending test.

In addition, as a result of the evaluation by the technique described above, although the neutron shielding effect could not be confirmed on test No. 1 being a Comparative Example, all of Nos. 2 to 24 being Inventive Example of the present invention exhibited neutron shielding effects of 1 or more, and the neutron shielding effect could be confirmed.

Note that, a stainless steel sheet having a B content of 0.5%, used for a nuclear fuel storage rack, (4 mm thickness) exhibited a neutron shielding effect of 23.7. Test Nos. 4 to 7, 10, 13, 14, 17, 20, and 21 exhibited neutron shielding effects higher than the neutron shielding effect of this stainless steel sheet.

Example 5-2

Neutron shielding sheets of test Nos. 25 to 34 shown in Table 14 were produced by the following method.

TABLE 14

| | Titanium material for hot working | | | | Titanium composite material | | | | | | |
|---|---|---|---|---|---|---|---|---|---|---|---|
| Test No. | Material used as inner portion of package | Interior pure titanium | Package thickness (mm) | Titanium material degree of vacuum (Pa) | B content of surface layer portion (mass %) | Surface layer portion ratio (%) | Porosity (%) | Crack evaluation | Occurrence rate of crack in bending test (%) | Neutron shielding effect | |
| 25 | Briquette + titanium sponge + scrap | JIS Class 1 | 10 | $8 \times 10^{-3}$ | — | —* | 0.1 | No crack | 0 | 1.0 | Comp. Ex |
| 26 | Briquette + titanium sponge + scrap | JIS Class 1 | 5 | $8 \times 10^{-3}$ | 2.4 | 5 | 0.1 | No crack | 0 | 5.5 | Inventive Example |
| 27 | Briquette + titanium sponge + scrap | JIS Class 1 | 20 | $8 \times 10^{-3}$ | 1.5 | 20 | 0.1 | No crack | 0 | 14.8 | |
| 28 | Briquette + titanium sponge + scrap | JIS Class 1 | 40 | $8 \times 10^{-3}$ | 2.8 | 40 | 0.2 | No crack | 0 | 36.0 | |
| 29 | Briquette + titanium sponge + scrap | JIS Class 2 | 5 | $8 \times 10^{-3}$ | 3.0 | 5 | 0.2 | No crack | 0 | 6.2 | |
| 30 | Briquette + titanium sponge + scrap | JIS Class 2 | 20 | $8 \times 10^{-3}$ | 0.5 | 20 | 0.2 | No crack | 0 | 10.3 | |
| 31 | Briquette + titanium sponge + scrap | JIS Class 2 | 40 | $8 \times 10^{-3}$ | 1.9 | 40 | 0.1 | No crack | 0 | 31.9 | |
| 32 | Briquette + titanium sponge + scrap | JIS Class 3 | 5 | $8 \times 10^{-3}$ | 1.3 | 5 | 0.2 | No crack | 0 | 4.0 | |
| 33 | Briquette + titanium sponge + scrap | JIS Class 3 | 20 | $8 \times 10^{-3}$ | 2.7 | 20 | 0.1 | No crack | 0 | 18.8 | |
| 34 | Briquette + titanium sponge + scrap | JIS Class 3 | 40 | $8 \times 10^{-3}$ | 0.1 | 40 | 0.1 | No crack | 0 | 14.6 | |

The mark "*" indicates that the value fell out of the definition according to the present invention.

By a similar procedure of Example 5-1, a Ti—B package 6 having different sheet thickness and chemical composition were assembled, and a titanium material 5 having a thickness of 100 mm and including the inner portion packed with a titanium sponge and cut scraps was manufactured.

Using steel manufacture facility, this titanium material 5 was heated at 800° C. for 240 minutes and thereafter subjected to hot rolling, and thereby strip coils having a thickness of about 5 mm were produced.

The strip coils after the hot rolling were subjected to strip running through a continuous pickling line consisting of nitric-hydrofluoric acid, in addition, the titanium material was subjected to cold rolling to be formed into a titanium sheet having a thickness of 1 mm, subjected to heat treatment in which the titanium material was heated to 600 to 750° C. and retained for 240 minutes in vacuum or in an inert gas atmosphere, as annealing treatment, and thereby a titanium composite material 1 was manufactured.

The titanium composite material 1 being a cold-rolled sheet subjected to visual check to observe an occurrence situation of a crack in a surface inspection process after the annealing. Note that, as to a method for measuring the depth of the first surface layer portion 2 and the second surface layer portion 3 (B concentrated layers), portions of the titanium composite material 1 were cut out (at three spots of a front end, middle, and rear end in the longitudinal direction, extracted from the width-direction-center portions, respectively), polished, and subjected to SEM/EDS analysis, and the proportion of the first surface layer portion 2 and the second surface layer portion 3 with respect to the sheet thickness of the titanium composite material 1 and the B content of the first surface layer portion 2 and the second surface layer portion 3 were determined (the average value in an observation spot was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am-Be (4.5 MeV) was used as a radiation source, and a test specimen having dimensions of 500 mm×500 mm×1 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen (1 mm thickness) and the test specimen (1 mm thickness), and the neutron shielding effect was evaluated based on the ratio between the measured values (the value for each test specimen is described for a case where the neutron shielding effect of commercially pure titanium of JIS Class 1 is taken as "1").

The results are shown collectively in Table 14.

Comparative Examples and Inventive Example of the present invention of test Nos. 25 to 28 were a case where the kind of a base metal was the pure titanium JIS Class 1.

Test No. 25 being a Comparative Example was a case where a commercially pure titanium not containing B was used as the package 6, rather than Ti—B alloy sheets. There was no crack or the like occurring on the cold-rolled sheet, and no crack occurred in a bending test.

Test Nos. 26 to 28 being Inventive Example of the present invention were a case where the ratio, B content, and porosity of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the cold-rolled sheets, and no crack occurred in a bending test.

Inventive Example of the present invention of Test Nos. 29 to 31 were a case where the kind of the base metal was the pure titanium JIS Class 2, and the ratio, B content, and porosity of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the cold-rolled sheets, and no crack occurred in a bending test.

Inventive Example of the present invention of Nos. 32 to 34 were a case where the kind of the base metal was the pure titanium JIS Class 3, and the ratio, B content, and porosity of the first surface layer portion 2 and the second surface layer portion 3 were changed. The ratio of the first surface layer portion 2 and the second surface layer portion 3 fell within a range of 5 to 40%, the B content of the first surface layer portion 2 and the second surface layer portion 3 fell within a range of 0.1 to 3.0%, therefore there was no crack occurring on all of the cold-rolled sheets, and no crack occurred in a bending test.

In addition, as a result of the evaluation by the technique described above, although the neutron shielding effect could not be confirmed on test No. 25 being a Comparative Example, all of Nos. 26 to 34 being Inventive Example of the present invention exhibited neutron shielding effects of 1 or more, and the neutron shielding effect could be confirmed.

REFERENCE SIGNS LIST

1 Titanium composite material
2 First surface layer portion
3 Second surface layer portion
4 Surface layer portion
5 Titanium material for hot working
6 Package
7 Titanium lump

The invention claimed is:

1. A titanium material for hot working, comprising:
 a package; and
 one or more types selected from a titanium sponge, a briquette obtained by compressing a titanium sponge, and a commercially pure titanium scrap, with which the package is packed, the average particle size of the titanium sponge, a briquette obtained by compressing a titanium sponge, and a commercially pure titanium scrap being 1 mm or more,
 wherein
 a portion of the package consists of a titanium alloy, the portion constituting an outer layer after hot working, and
 a degree of vacuum of an inner portion of the titanium material is made 10 Pa or less.

2. The titanium material for hot working according to claim 1, wherein
 the titanium alloy has a chemical composition comprising, by mass %,
 platinum group elements: 0.01 to 0.25%,
 rare earth elements: 0 to 0.2%,
 Co: 0 to 0.8%,
 Ni: 0 to 0.6%, and
 a balance: Ti and impurities.

* * * * *